United States Patent
Suzuki et al.

(10) Patent No.: US 9,171,363 B2
(45) Date of Patent: Oct. 27, 2015

(54) COMPUTER-READABLE RECORDING MEDIUM AND ROAD SURFACE SURVEY DEVICE

(71) Applicant: FUJITSU LIMITED, Kawasaki-shi (JP)

(72) Inventors: Fumiaki Suzuki, Komae (JP); Takashi Shimada, Shinagawa (JP); Kazuyoshi Kuzunishi, Hasuda (JP); Hiroyuki Tani, Katsushika (JP); Kosei Takano, Fujimino (JP); Takuji Numata, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 13/670,034

(22) Filed: Nov. 6, 2012

(65) Prior Publication Data

US 2013/0170701 A1    Jul. 4, 2013

(30) Foreign Application Priority Data

Dec. 28, 2011   (JP) ................................ 2011-290028

(51) Int. Cl.
```
G06K 9/00      (2006.01)
G06T 7/00      (2006.01)
G01B 21/30     (2006.01)
G06Q 10/06     (2012.01)
G06Q 50/08     (2012.01)
```
(52) U.S. Cl.
CPC . *G06T 7/00* (2013.01); *G01B 21/30* (2013.01); *G06Q 10/06* (2013.01); *G06Q 50/08* (2013.01)

(58) Field of Classification Search
None
See application file for complete search history.

(56) References Cited

U.S. PATENT DOCUMENTS

| | | | | |
|---|---|---|---|---|
| 2004/0111014 | A1* | 6/2004 | Hickle | 600/300 |
| 2011/0173039 | A1* | 7/2011 | Villalobos et al. | 705/7.12 |
| 2011/0221906 | A1* | 9/2011 | Xu et al. | 348/148 |
| 2012/0089554 | A1* | 4/2012 | Claxton et al. | 706/52 |
| 2013/0155061 | A1* | 6/2013 | Jahanshahi et al. | 345/419 |
| 2013/0163820 | A1* | 6/2013 | Shimomura et al. | 382/104 |
| 2013/0169794 | A1* | 7/2013 | Shimomura et al. | 348/128 |
| 2013/0173208 | A1* | 7/2013 | Kuzunishi et al. | 702/141 |

FOREIGN PATENT DOCUMENTS

| | | |
|---|---|---|
| JP | 2005-115687 | 4/2005 |
| WO | WO 2011/001162 A1 * | 1/2011 |

OTHER PUBLICATIONS

Koch, C. and Brilakis, I. "Pothole detection in asphalt pavement images," Advanced Engineering Informatics 25 (2011): 507-515.*
Sukumar et al. "Multi-sensor Integration for Unmanned Terrain Modeling," Proc. of SPIE, vol. 6230 (2006): pp. 1-10.*

* cited by examiner

*Primary Examiner* — Barry Drennan
*Assistant Examiner* — Samah Beg
(74) *Attorney, Agent, or Firm* — Fujitsu Patent Center

(57) ABSTRACT

A road surface survey device specifies a position at which abnormality is detected at one of a position at which abnormality on pavement of a road surface is detected from an image of a road captured by a camera and a position at which abnormality on pavement of a road surface is detected from a change in an acceleration measured when a car runs on the road surface by a G sensor. Further, the road surface survey device derives conditions that abnormality which is not detected at the specified position can be detected, and outputs an instruction of a resurvey for the specified position under the derived conditions.

6 Claims, 17 Drawing Sheets

FIG.4

| ABNORMALITY DETECTION POINT | | | DATE | ABNORMALITY INFORMATION | | |
|---|---|---|---|---|---|---|
| ROUTE | CAR LANE DISTINCTION | SPOT | | VERTICAL G | SOUND | IMAGE |
| AY | INBOUND | AY22 | 2012.01.19 10:01:02 | 1 | 1 | 1 |
| AY | INBOUND | AY23 | 2012.01.19 10:05:00 | 1 | | |
| AY | INBOUND | AY24 | 2012.01.19 10:10:00 | | 1 | |
| AY | INBOUND | AY25 | 2012.01.19 10:12:00 | | | 1 |
| AY | INBOUND | AY26 | 2012.01.19 10:15:00 | | 1 | |
| AY | INBOUND | AY27 | 2012.01.19 10:18:00 | | 1 | 1 |
| AY | INBOUND | AY28 | 2012.01.19 10:20:00 | 1 | | |
| AY | INBOUND | AY29 | 2012.01.19 10:25:00 | | | 1 |
| AY | INBOUND | AY30 | 2012.01.19 10:32:00 | | 1 | 1 |
| AY | INBOUND | AY31 | 2012.01.19 10:35:00 | 1 | | |
| AY | INBOUND | AY32 | 2012.01.19 10:42:00 | 1 | | 1 |
| AY | INBOUND | AY33 | 2012.01.19 10:50:00 | | 1 | |

|          | VERTICAL G | SOUND | IMAGE | DECISION    |
|----------|------------|-------|-------|-------------|
| PATTERN 1 | 1          | 1     | 1     | ESTABLISHED |
| PATTERN 2 | 1          |       | 1     | ?           |
| PATTERN 3 |            | 1     | 1     | ?           |
| PATTERN 4 | 1          |       |       | ?           |
| PATTERN 5 |            | 1     |       | ?           |
| PATTERN 6 |            |       | 1     | ?           |

FIG.13

| ABNORMALITY DETECTION POINT | | | DATE | ABNORMALITY INFORMATION | | | ESTIMATED CAUSE | | | |
|---|---|---|---|---|---|---|---|---|---|---|
| ROUTE | CAR LANE DISTINCTION | SPOT | | VERTICAL G | SOUND | IMAGE | LACK OF FIELD OF VIEW | LACK OF SUNSHINE | BAD WEATHER | LOW SPEED |
| AY | INBOUND | AY22 | 2012.01.19 10:01:02 | 1 | 1 | 1 | | | | |
| AY | INBOUND | AY23 | 2012.01.19 10:05:00 | 1 | | | | | | |
| AY | INBOUND | AY24 | 2012.01.19 10:10:00 | | 1 | | | | | |
| AY | INBOUND | AY25 | 2012.01.19 10:12:00 | | | 1 | | | | 1 |
| AY | INBOUND | AY26 | 2012.01.19 10:15:00 | | 1 | | | | | |
| AY | INBOUND | AY27 | 2012.01.19 10:18:00 | | 1 | 1 | 1 | | | |
| AY | INBOUND | AY28 | 2012.01.19 10:20:00 | 1 | | | | 1 | | |
| AY | INBOUND | AY29 | 2012.01.19 10:25:00 | | | 1 | | | | 1 |
| AY | INBOUND | AY30 | 2012.01.19 10:32:00 | | 1 | 1 | | | | |
| AY | INBOUND | AY31 | 2012.01.19 10:35:00 | 1 | | | | | | 1 |
| AY | INBOUND | AY32 | 2012.01.19 10:42:00 | 1 | | 1 | | | 1 | 1 |
| AY | INBOUND | AY33 | 2012.01.19 10:50:00 | | 1 | | | | 1 | |

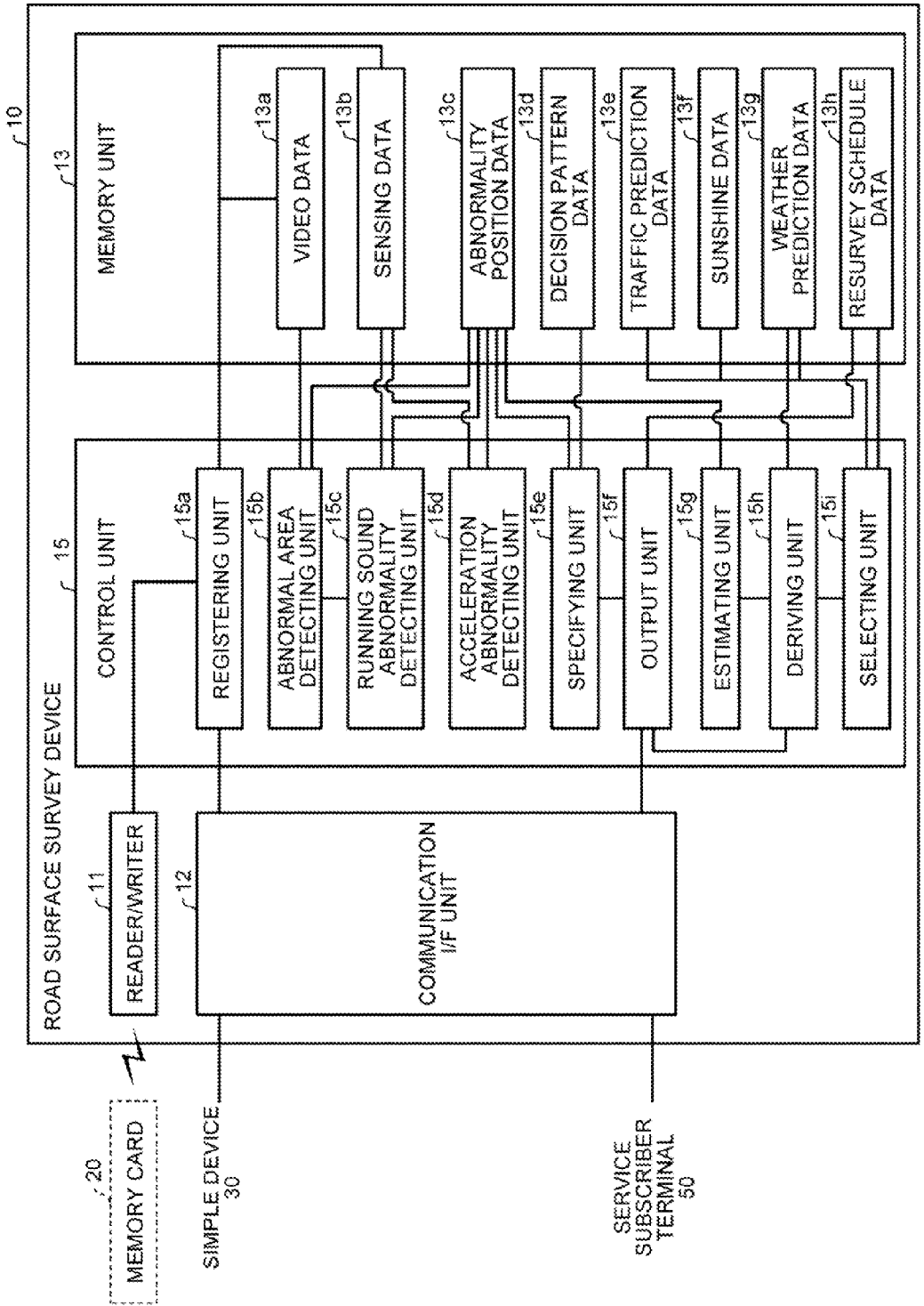

FIG.16

| PREDICTED DAY | ROUTE | CAR LANE DISTINCTION | TIME ZONE | |
|---|---|---|---|---|
| | | | MORNING | AFTERNOON |
| JANUARY 9 | AA | INBOUND | CONGESTED | - |
| | AA | OUTBOUND | DESERTED | - |
| | . | . | . | - |
| | AY | INBOUND | DESERTED | - |
| | . | . | . | . |

FIG.17

| PERIOD | SUNSHINE TIME ZONE | |
|---|---|---|
| | START OF SUNSHINE | END OF SUNSHINE |
| JANUARY 9 | 9:00 | 17:00 |

FIG.18

| DATE | WEATHER |
|---|---|
| JANUARY 9 | SUNNY AND RAINY LATER |

FIG.19

| ROUTE | CAR LANE DISTINCTION | CAR ALLOCATION PLAN | | |
|---|---|---|---|---|
| | | CAR NUMBER | DEPARTURE DAY | DEPARTURE TIME |
| AA | INBOUND | CAR NUMBER NO. 32 | JANUARY 11 | 12:00 |
| AA | OUTBOUND | CAR NUMBER NO. 68 | JANUARY 12 | 10:00 |
| . | . | . | . | . |
| AY | INBOUND | CAR NUMBER NO. 23 | JANUARY 20 | 9:00 |
| . | . | . | . | . |
| . | . | . | . | . |

FIG.20

| RUNNING CONDITIONS=[TRAFFIC (DESERTED)] AND [IMAGE CAPTURING (DAYTIME)] AND [WEATHER (SUNNY)] |

| | ROUTE | CAR LANE DISTINCTION | TIME ZONE | |
|---|---|---|---|---|
| | | | MORNING | AFTERNOON |
| JANUARY 10 | AA | INBOUND | CONGESTED | DESERTED |
| | AA | OUTBOUND | DESERTED | CONGESTED |
| | . | . | . | . |
| | AY | INBOUND | DESERTED | CONGESTED |
| | . | . | . | . |

| | ROUTE | CAR LANE DISTINCTION | TIME ZONE | |
|---|---|---|---|---|
| | | | MORNING | AFTERNOON |
| JANUARY 11 | AA | INBOUND | CONGESTED | DESERTED |
| | AA | OUTBOUND | DESERTED | DESERTED |
| | . | . | . | . |
| | AY | INBOUND | CONGESTED | CONGESTED |
| | . | . | . | . |

| | ROUTE | CAR LANE DISTINCTION | TIME ZONE | |
|---|---|---|---|---|
| . | | | MORNING | AFTERNOON |
| | . | . | . | . |

| PERIOD | SUNSHINE TIME ZONE | |
|---|---|---|
| | START OF SUNSHINE | END OF SUNSHINE |
| JANUARY TO APRIL | 9:00 | 17:00 |
| MAY TO AUGUST | 7:00 | 18:00 |
| SEPTEMBER TO DECEMBER | 8:00 | 16:00 |

| DATE | WEATHER |
|---|---|
| JANUARY 10 | RAINY |
| JANUARY 11 | SUNNY |
| . | . |
| JANUARY 23 | SUNNY |
| JANUARY 24 | RAINY |
| JANUARY 25 | SUNNY |
| JANUARY 26 | SUNNY |
| JANUARY 27 | RAINY |
| . | . |
| . | . |

| ROUTE | CAR LANE DISTINCTION | CAR ALLOCATION PLAN | | |
|---|---|---|---|---|
| | | CAR NUMBER | DEPARTURE DAY | DEPARTURE TIME |
| AA | INBOUND | CAR NUMBER NO. 32 | JANUARY 11 | 12:00 |
| AA | OUTBOUND | CAR NUMBER NO. 68 | JANUARY 12 | 10:00 |
| . | . | . | . | . |
| AY | INBOUND | CAR NUMBER NO. 23 | JANUARY 20 | 9:00 |
| . | . | . | . | . |
| . | . | . | . | . |

COMPUTER-READABLE RECORDING MEDIUM AND ROAD SURFACE SURVEY DEVICE

CROSS-REFERENCE TO RELATED APPLICATION

This application is based upon and claims the benefit of priority of the prior Japanese Patent Application No. 2011-290028, filed on Dec. 28, 2011, the entire contents of which are incorporated herein by reference.

FIELD

The embodiments discussed herein are directed to a road surface survey program and a road surface survey device.

BACKGROUND

Road pavement deteriorates due to an interaction with a traffic load or natural environment. Roads need little repair cost if road surfaces are less deteriorated. Hence, it is desired to find deterioration of roads at an early stage.

Therefore, there is a technique of mounting a checkout device provided with a camera, an acoustic sensor and an acceleration sensor on a vehicle, and detecting deterioration of roads based on images captured by the camera, acoustic data detected by the acoustic sensor and vibration data detected by the vibration sensor.

Japanese Laid-open Patent Publication No. 2005-115687

However, when deterioration of roads is detected using a plurality of detection results such as images captured by a camera, acoustic data detected by an acoustic sensor and vibration data detected by a vibration sensor, deterioration is only detected in part of detection results in some cases. When deterioration is detected only in part of detection results as described above, it is not possible to determine that deterioration occurs. When, for example, deterioration of pavement is not detected from an image while vibration is detected from vibration data, causes include that it is not possible to detect deterioration from an image because the image is captured at night or under a bad weather and therefore is dark and that a car runs over a stone on a road surface and therefore vertical vibration is detected from vibration data.

SUMMARY

According to an aspect of an embodiment, a computer-readable recording medium stores a road surface survey program causing a computer to execute a process for surveying a road surface. The process includes specifying a position at which abnormality is detected at one of a position at which abnormality is detected by a first detecting unit which detects abnormality on pavement of a road surface from an image of a road captured by an image capturing unit mounted on a vehicle and a position at which abnormality is detected by a second detecting unit which detects abnormality on pavement of a road surface from a change in an acceleration measured when the vehicle runs on the road surface by an acceleration sensor mounted on the vehicle; deriving a condition that abnormality which is not be detected at the specified position can be detected; and outputting an instruction of a resurvey for the specified position under the derived condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view illustrating a configuration example of abnormality position data according to the first embodiment;
FIG. 13 is a view illustrating a configuration example of abnormality position data according to the second embodiment;
FIG. 15 is a block diagram illustrating a functional configuration of a road surface survey device according to a third embodiment;
FIG. 16 is a view illustrating a configuration example of traffic prediction data;
FIG. 17 is a view illustrating a configuration example of sunshine data;
FIG. 18 is a view illustrating a configuration example of weather prediction data;
FIG. 19 is a view illustrating a configuration example of resurvey schedule data;
FIG. 20 is a view schematically illustrating a flow of selecting a time schedule in a selecting unit.

DESCRIPTION OF EMBODIMENTS

Preferred embodiments of the present invention will be explained with reference to accompanying drawings. In addition, these embodiments are by no means limited to a disclosed technique. Further, each embodiment can be adequately combined within a scope which does not contradict processing content.

[a] First Embodiment

System Configuration

Figure 1:
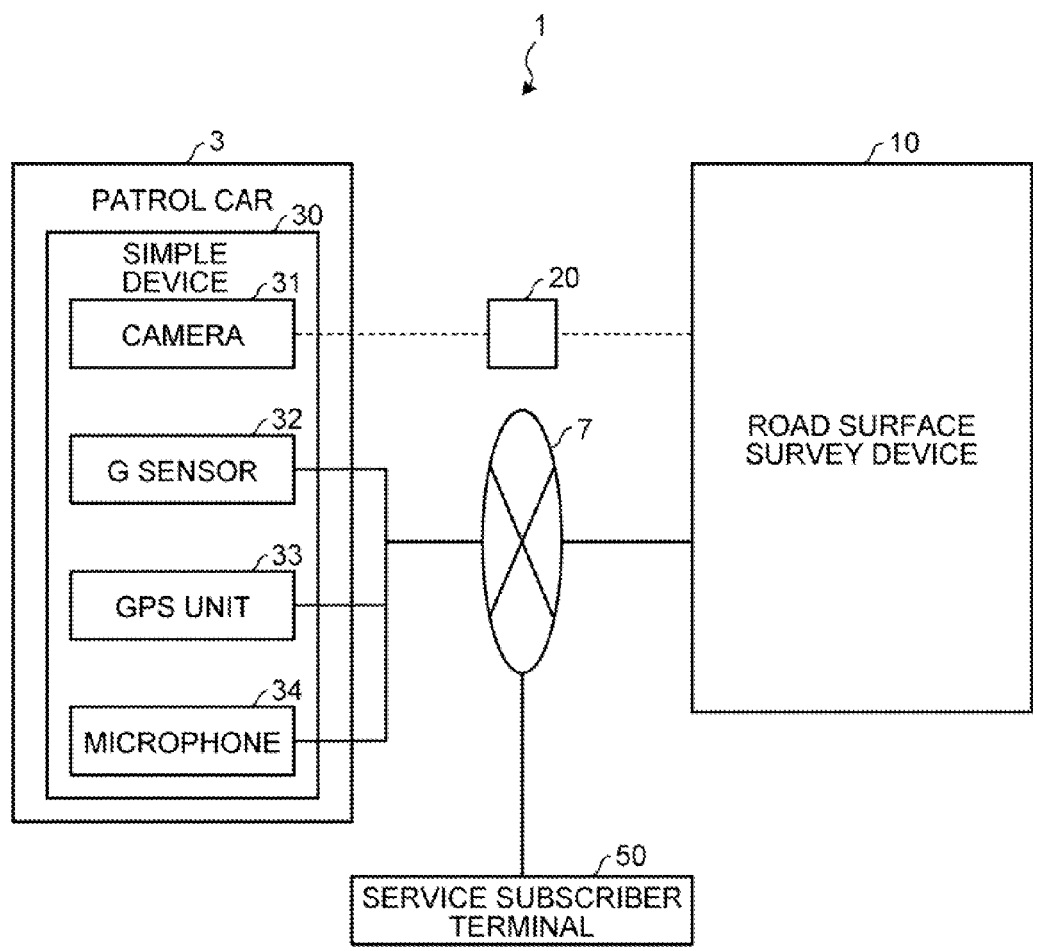
FIG. 1 is a view illustrating a configuration of a road surface survey system according to a first embodiment.

First, a configuration of a road surface survey system according to the present embodiment will be described. FIG. 1 is a view illustrating the configuration of the road surface survey system according to a first embodiment. A road surface survey system 1 illustrated in FIG. 1 detects deterioration of a road surface from an image and an acceleration acquired when a patrol car 3 runs on the road by means of a simple device 30 mounted on the patrol car 3.

As illustrated in FIG. 1, this road surface survey system 1 has a road surface survey device 10, the simple device 30 and a service subscriber terminal 50. In addition, although a case has been described with an example in FIG. 1 where one simple device 30 and one service subscriber terminal 50 are provided, the disclosed system is not limited to this, and the number of simple devices and the number of service subscriber terminals may be arbitrary.

These road surface survey device 10, simple device 30 and service subscriber terminal 50 are connected to communicate through a network 7. This network 7 can adopt an arbitrary network such as Internet, a LAN (Local Area Network) and a VPN (Virtual Private Network) irrespectively of a wired or wireless network. In addition, data can be outputted and inputted between the road surface survey device 10 and the simple device 30 not only through the network 7 but also through a memory card 20.

Of these devices, the simple device 30 is a car-mounted machine mounted on the patrol car 3. This patrol car 3 on which the simple device 30 is mounted is a vehicle used to patrol roads, and arbitrary types of cars can be adopted for the patrol car 3 irrespectively of sizes such as light-size cars, standard-size cars and big-size cars, usages such as daily use, business use and special use and the number of wheels such as four wheels and two wheels.

With this simple device 30, a minimum number of sensors which enable the road surface survey device 10 which will be described below to detect deterioration of road surfaces are mounted. For example, the simple device 30 has a camera 31, a G (gravitation) sensor 32, a GPS (Global Positioning System) unit 33 and a microphone 34. In addition, although a case will be described with the example of FIG. 1 where the simple device 30 has four sensors, the camera 31, the G sensor 32 and the GPS unit 33 may be mounted to detect deterioration of road surfaces.

Of these components, the camera 31 is attached to a position from which images of road surfaces of roads can be captured. For example, the camera 31 may be attached to a predetermined position at a front part of the patrol car 3 such as the vicinity of a front number plate, or may be attached at a predetermined position at a rear part of the patrol car 3 such as the vicinity of a rear number plate. Further, the G sensor 32, the GPS unit 33 and the microphone 34 can be attached at arbitrary positions of the patrol car 3. In this case, when the G sensor 32 is set to a portion at which vibration of a car body is not buffered by a suspension of the patrol car 3, a little vibration due to, for example, pebbles other than deterioration of roads such as dents, tracks or cracks or an inclination of a slope is measured as a greater value of a gravitational acceleration. Hence, the G sensor 32 is preferably set at a portion at which vibration of the car body is buffered by the suspension of the patrol car 3. Further, the microphone 34 collects a running sound from tires of the patrol car 3, and is preferably set near a fender of the car or in tire houses which accommodate the tires. In addition, hereinafter, images of roads captured by the camera 31 are referred to as "road images" in some cases. Hereinafter, the gravitational acceleration measured by the G sensor 32 is also referred to as "acceleration data", and position data including coordinate values of the longitude and the latitude measured by the GPS unit 33 and sound data collected by the microphone 34 are collectively referred to as "sensing data" in some cases.

The simple device 30 uploads the road image and the sensing data to the road surface survey device 10. According to the first aspect, the simple device 30 uploads the sensing data through the network 7, and uploads the road image through the memory card 20. Thus, when uploading the road image through the memory card 20, the simple device 30 writes video data of a movie including frames of a plurality of road images in the memory card 20. A researcher on the patrol car 3 brings this memory card 20 to the road surface survey device 10 or the service subscriber terminal 50, and video data is read by a card reader attached to or built in the road surface survey device 10 or the service subscriber terminal 50. In this case, when the video data is read by the service subscriber terminal 50, the video data is uploaded from the service subscriber terminal 50 to the road surface survey device 10 through the network 7. In addition, data rewritable semiconductor memory such as a flash memory or a NVSRAM (Non Volatile Static Random Access Memory) can be adopted for the memory card 20. Further, a storage device such as a hard disk or an optical disk may be used instead of the memory card 20.

In addition, although a case has been described where the road image is uploaded through the memory card 20, the road image may be uploaded through the network 7 similar to the sensing data. Further, when video data or sensing data is uploaded through the network 7, the video data or the sensing data may be uploaded in real time or may be uploaded by batch processing.

The road surface survey device 10 is a server device which provides road surface survey service. This road surface survey device 10 may be implemented as a web server or may be implemented as a cloud. According to the first aspect, the road surface survey device 10 detects deterioration of a road surface using video data or sensing data uploaded from the simple device 30. Then, when receiving a request for browsing a deteriorated portion from the service subscriber terminal 50 which will be described below, the road surface survey device 10 provides the following information to the service subscriber terminal 50. That is, the road surface survey device 10 provides to the service subscriber terminal 50 a road image from which deterioration of a road is detected in the first place and a change in preceding and subsequent gravitational accelerations before and after image capturing and coordinate values of the longitude and the latitude.

The service subscriber terminal 50 is a terminal device used by a service subscriber who subscribes the road surface survey service. The first aspect of this service subscriber terminal 50 can adopt a fixed terminal such as a personal computer (PC) in the first place. Another aspect can adopt a mobile terminal such as a mobile telephone, a PHS (Personal Handyphone System) and a PDA (Personal Digital Assistant).

Meanwhile, the road surface survey device 10 according to the present embodiment detects abnormality on pavement of a road surface from the road surface of a road image captured by the camera 31. Further, the road surface survey device 10 according to the present embodiment detects abnormality on pavement of the road surface from an acceleration measured by the G sensor 32 when a car runs on the road surface. Furthermore, the road surface survey device 10 according to the present embodiment detects abnormality on pavement of a road surface from sound data recorded by the microphone 34 when a car runs on the road surface. The road surface survey device 10 according to the present embodiment specifies one or two positions at which abnormality is detected among positions at which abnormality is detected from a road image, the acceleration and sound data. Further, the road surface survey device 10 according to the present embodiment outputs an instruction of a resurvey of the specified position.

A state of pavement of a road is surveyed on a regular basis by running a special vehicle such as a road surface property monitoring car. However, the road surface property monitoring car is costly and rare, and therefore has difficulty in highly frequently surveying the road surface. Therefore, it is not possible to detect deterioration of a road surface at an early stage while depending on the road surface property monitoring car to survey the road surface.

Hence, with the road surface survey system 1 according to the present embodiment, the simple device 30 is mounted on the patrol car 3 to collect a road image, the acceleration and a running sound. Further, the road surface survey system 1 surveys deterioration of a road from the collected road image, acceleration and running sound by means of the road surface survey device 10. Consequently, the road surface survey device 10 according to the present embodiment can detect deterioration of a road surface at an early stage. Further, the road surface survey device 10 according to the present embodiment can detect deterioration of a road surface at an early stage and, consequently, reduce cost for repairing the road.

Furthermore, the road surface survey device 10 according to the present embodiment can detect deterioration of the road surface. Hence, with the road surface survey device 10 according to the present embodiment, multiple radar gauges and multiple cameras are not necessary to be set in a vehicle similar to the road surface property monitoring car, and a measurement control device which adaptively performs measurement using the radar displacement gauges and the cameras are not necessary to be provided in a vehicle. Consequently, the road surface survey device 10 according to the present embodiment can easily provide equipment of the patrol car 3 at low cost and highly frequently survey the road surface.

Further, the road surface survey device 10 according to the present embodiment is not capable of determining that deterioration occurs when abnormality is detected only in part of detection results of a road image, the acceleration and sound data. Hence, the road surface survey device 10 according to the present embodiment specifies one or two positions at which abnormality is detected among positions at which abnormality is detected from a road image, the acceleration and sound data. Further, the road surface survey device 10 according to the present embodiment outputs an instruction of a resurvey of the specified position. Consequently, the road surface survey device 10 according to the present embodiment is capable of efficiently resurveying deterioration of the road surface by indicating a position and outputting an instruction of a resurvey.

Configuration of Simple Device 30

Figure 2:
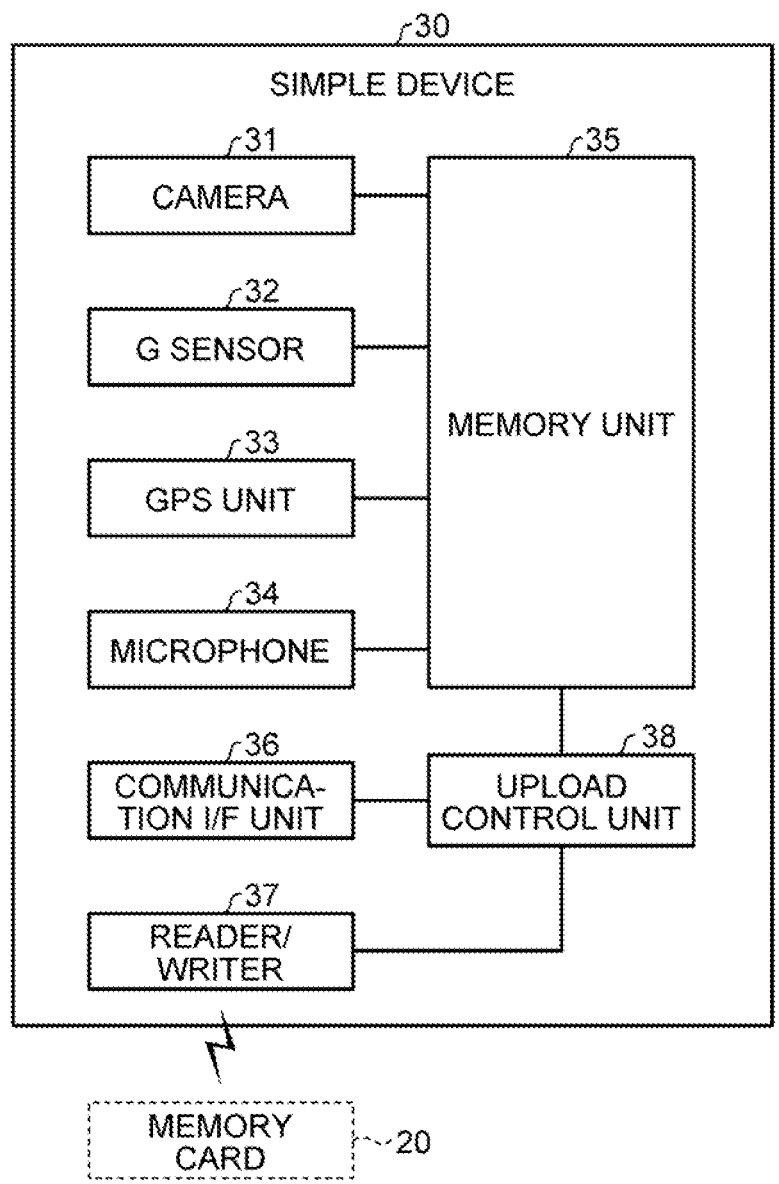
FIG. 2 is a block diagram illustrating a functional configuration of a simple device according to the first embodiment.

Next, a functional configuration of the simple device 30 included in the road surface survey system according to the present embodiment will be described. FIG. 2 is a block diagram illustrating the functional configuration of the simple device according to the first embodiment. As illustrated in FIG. 2, the simple device 30 has the camera 31, the G sensor 32, the GPS unit 33, the microphone 34, a memory unit 35, a communication I/F (interface) unit 36, a reader/writer 37 and an upload control unit 38. In addition, sensors other than the above sensors such as a car speed sensor and a steering angle sensor may be further mounted on the simple device 30.

Of these components, the camera 31 is an image capturing device which captures images using an image capturing element such as a CCD (Charge Coupled Device) or a CMOS (Complementary Metal Oxide Semiconductor). According to the first aspect, the camera 31 associates and stores a road image and an image capturing time in the memory unit 35 which will be described below by embedding the image capturing time in a frame of the road image as header information every time the road image is captured at a predetermined frame rate. This image capturing time may be a time which has passed from a starting point of a first frame of the road image, or may be a global time measured by, for example, a time stamp. Further, the frame rate may adopt, for example, 24 fps (frame per second), 30 fps or 60 fps such that the same portion of a road partially overlaps between frames of the road image. When the image capturing time is the elapsed time, an image capturing start date on which image capturing is started is embedded in a header. In addition, video data obtained by encoding a road image to encoded data of a movie by an encoder which is not illustrated is stored in the memory unit 35 which will be described below.

The G sensor 32 is a sensor which measures the gravitational acceleration. According to the first aspect, the G sensor 32 stores acceleration data which associates the gravitational acceleration and a measurement time of the gravitational acceleration in the memory unit 35 which will be described below every time the gravitational acceleration is measured. Such an acceleration measuring system can adopt a semiconductor system in the first place, and an arbitrary system such as a mechanical system or an optical system. The measurement time may be a time which has passed from a start time of a time when measurement is started, and may use a global time measured by, for example, a time stamp. When the measurement time is the elapsed time, acceleration data in the header of which the measurement start date on which measurement is started is embedded is stored in the memory unit 35 which will be described below. In addition, although a case will be assumed where the G sensor 32 measures the gravitational acceleration at a cycle of one second, a measurement cycle of the G sensor 32 is not limited to this, and is applicable to a case where the gravitational acceleration is measured at an arbitrary cycle. Further, although a case has been described where the G sensor 32 which measures the acceleration in a gravitational direction is mounted, a triaxial acceleration sensor which measures the acceleration in an X axis direction, a Y axis direction and a Z axis direction may be adopted.

The GPS unit 33 is a unit which receives radio waves from a plurality of GPS satellites, calculates the distance to each GPS satellite and measures coordinate values such as the longitude and the latitude. According to the first aspect, the GPS unit 33 stores position data which associates the coordinate values and a measuring date of the coordinate values in the memory unit 35 described later every time the coordinate values of the longitude and the latitude are measured. In addition, although a case will be assumed below where the GPS unit 33 measures the coordinate values of the longitude and the latitude at the cycle of one second, the measurement cycle of the GPS unit 33 is not limited to this, and is applicable to a case where the coordinate values are measured at an arbitrary cycle.

The microphone 34 is a device which converts a sound into an electrical signal. According to the first aspect, the microphone 34 converts an electrical signal converted from a sound, into digital data at a predetermined sampling frequency, encodes the converted data in a predetermined format, and stores the sound data in the header of which a recording start time at which recording is started is embedded, in the memory unit 35 which will be described below.

The memory unit 35 is a memory device which stores various items of data. For example, the memory unit 35 stores video data in the first place, and sensing data such as acceleration data, position data and sound data. The first aspect of this memory unit 35 adopts a data rewritable semiconductor memory such as a flash memory or a NVSRAM (Non Volatile Static Random Access Memory) and, in addition, a storage device such as a hard disk or an optical disk.

The communication I/F unit 36 is an interface which controls communication with another device such as the road surface survey device 10. For example, the communication I/F unit 36 transmits the sensing data accumulated in the memory unit 35 to the road surface survey device 10. The first aspect of this communication I/F unit 36 can adopt a network interface card (NIC) such as a LAN card or a modem.

In addition, although a case has been described above where the sensing data is transmitted to the road surface survey device 10 through the communication I/F unit 36, an upload does not necessarily need to be executed through communication. For example, sensing data can be uploaded through the memory card 20. In this case, the reader/writer 37 is controlled by the upload control unit 38 which will be described below to write the sensing data in the memory card 20.

The reader/writer 37 is a device which reads data from the memory card 20 and writes data in the memory card 20. According to the first aspect, when receiving a write instruction from the upload control unit 38 which will be described below in a state where the memory card 20 is attached to a predetermined position, the reader/writer 37 writes video data stored in the memory unit 35 in the memory card 20.

The upload control unit 38 is a processing unit which controls the communication I/F unit 36, and controls the upload to the road surface survey device 10. According to the first aspect, the upload control unit 38 transmits sensing data every time the G sensor 32, the GPS unit 33 and the microphone 34 write the sensing data such as acceleration data, position data and sound data in the memory unit 35. Further, the upload control unit 38 executes the following processing when receiving a write operation of video data from a road researcher or the accumulation amount of video data in the memory unit 35 is a predetermined data size. That is, the upload control unit 38 controls the reader/writer 37, and writes video data stored in the memory unit 35, in the memory card 20. In addition, the upload control unit 38 erases the uploaded sensing data and video data from the memory unit 35 when transmitting the sensing data to the road surface survey device 10 or writing the video data in the memory card 20.

In addition, the upload control unit 38 can adopt various integrated circuits and electronic circuits. The integrated circuit includes, for example, an ASIC (Application Specific Integrated Circuit). Further, the electronic circuit includes, for example, a CPU (Central Processing Unit) or a MPU (Micro Processing Unit).

Configuration of Road Surface Survey Device 10

Figure 3:
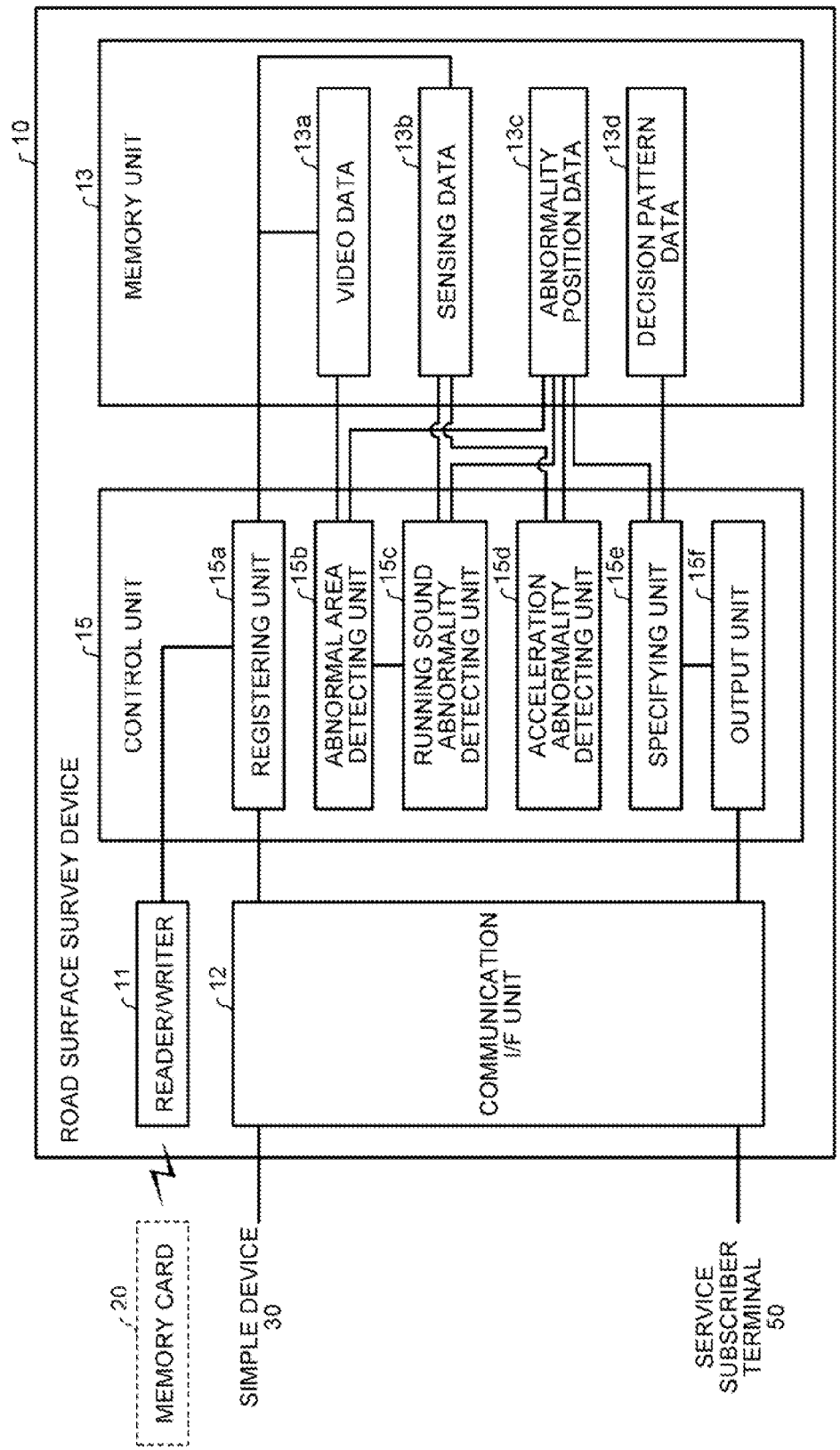
FIG. 3 is a block diagram illustrating a functional configuration of a road surface survey device according to the first embodiment.

Next, a functional configuration of the road surface survey device 10 according to the present embodiment will be described. FIG. 3 is a block diagram illustrating a functional configuration of the road surface survey device according to the first embodiment. As illustrated in FIG. 3, the road surface survey device 10 has a reader/writer 11, a communication I/F unit 12, a memory unit 13 and a control unit 15.

Of these components, the reader/writer 11 is a device which reads data from the memory card 20 and writes data in the memory card 20. According to the first aspect, the reader/writer 11 reads video data stored in the memory card 20 when receiving a read instruction from a registering unit 15a which will be described below in a state where the memory card 20 is attached to a predetermined position. Further, the reader/writer 11 outputs the video data to the registering unit 15a which will be described below.

The communication I/F unit 12 is an interface which controls communication with another device such as the simple device 30 or the service subscriber terminal 50. For example, the communication I/F unit 12 receives sensing data from the simple device 30 or transmits browsing data browsed by a road researcher to the service subscriber terminal 50. The first aspect of this communication I/F unit 12 can adopt a network interface card such as a LAN card.

The memory unit 13 is a semiconductor memory element such as a flash memory or a storage device such as a hard disk or an optical disk. In addition, the memory unit 13 is not limited to storage devices of the above types, and may be a RAM (Random Access Memory) or a ROM (Read Only Memory).

The memory unit 13 stores an OS (Operating System) executed by the control unit 15 and various programs used to survey road surfaces. Further, the memory unit 13 stores various items of data which are needed to execute programs executed by the control unit 15. The memory unit 13 stores video data 13a, sensing data 13b, abnormality position data 13c and decision pattern data 13d as an example of such data.

The video data 13a is video data obtained by capturing an image of a road by the camera 31 mounted on the patrol car 3. With one example, the video data read from the memory card 20 by the reader/writer 11 is registered as the video data 13a per car number of the patrol car 3 by the registering unit 15a which will be described below. With another example, an abnormal area detecting unit 15b which will be described below refers to the video data 13a to detect an area including abnormality such as a change in color on pavement of a road surface in a road image.

The sensing data 13b is data including acceleration data, position data and sound data acquired by the sensors mounted on the patrol car 3. With one example, the sensing data received from the simple device 30 is registered as the sensing data 13b per car number of the patrol car 3 by the registering unit 15a which will be described below. With another example, a running sound abnormality detecting unit 15c which will be described below refers to sound data included in the sensing data 13b to decide whether or not a running sound has a specific sound pattern of a running sound which occurs due to convexities and concavities. With still another example, an acceleration abnormality detecting unit 15d which will be described below refers to acceleration data included in the sensing data 13b to decide whether or not the gravitational acceleration includes abnormality such as convexities and concavities.

The abnormality position data 13c is data which represents a position at which abnormality is detected. With one example, a position at which the abnormal area detecting unit 15b which will be described below detects abnormality in a road image is registered as the abnormality position data 13c. With another example, a position at which the running sound abnormality detecting unit 15c which will be described below detects abnormality from sound data included in the sensing data 13b is registered as the abnormality position data 13c. With still another example, a position at which the acceleration abnormality detecting unit 15d which will be described below detects abnormality from acceleration data included in the sensing data 13b is registered as the abnormality position data 13c. With another example, a specifying unit 15e which will be described below refers to the abnormality position data 13c to instruct a resurvey of a road.

FIG. 4 is a view illustrating a configuration example of abnormality position data according to the first embodiment. As illustrated in FIG. 4, the abnormality position data 13c includes items of "abnormality detection spot", "date" and "abnormality information". The item of the abnormality detection spot is classified into "route", "car lane distinction" and "spot". The route is an area which stores information indicating a road on which abnormality is detected. The car lane distinction is an area which stores information indicating a car lane of a road on which abnormality is detected. With the present embodiment, whether a car lane of a road on which abnormality is detected is an inbound car lane or an outbound car lane is identified, and "inbound" is stored in case of the inbound car lane and "outbound" is stored in case of the outbound car lane. The item of the spot is an area which stores information indicating a position at which abnormality of a road is detected. With the present embodiment, an identification code indicating each section is set to a road per predetermined section, and the identification code is stored. In addition, in the item of the spot, coordinate values of the longitude and the latitude may be stored. The item of the date is an area which stores a date on which a car passes a section of a road. The item of the abnormality information is divided into "vertical G" "sound" and "image". The item of vertical G is an area which stores information indicating that abnormality is detected from acceleration data. The item of the sound is an area which stores information indicating that abnormality is detected from sound data. The item of the image is an area which stores information indicating that abnormality is detected from an image. Each item of vertical G, the sound and the image includes "1" when abnormality is detected and is left blank when abnormality is not detected.

With an example of FIG. 4, a spot "AY22" of an "inbound" car lane of a road "AY" is inspected at 10:01:02 on Jan. 19, 2012, and abnormality is detected in acceleration data, sound data and an image, respectively. Further, a spot "AY23" of the "inbound" car lane of the road "AY" is inspected at 10:05:00 on Jan. 19, 2012, and abnormality is detected only in acceleration data. Furthermore, a spot "AY24" of the "inbound" car lane of the road "AY" is inspected at 10:10:00 on Jan. 19, 2012, and abnormality is detected only in sound data. Still further, a spot "AY25" of the "inbound" car lane of the road "AY" is inspected at 10:12:00 on Jan. 19, 2012, and abnormality is detected only in an image.

The decision pattern data 13d is data which represents a decision pattern for deciding whether or not a road is deteriorated at a position at which abnormality is detected. With one example, the decision pattern data 13d may be registered in advance at a creation source of road surface survey software, and may be registered by an administrator from an input unit which is not illustrated or from a terminal device such as a client computer which can communicate with the road surface survey device 10. Further, with another example, the specifying unit 15e which will be described below refers to the decision pattern data 13d to instruct a resurvey of a road.

Figures 5, 6:
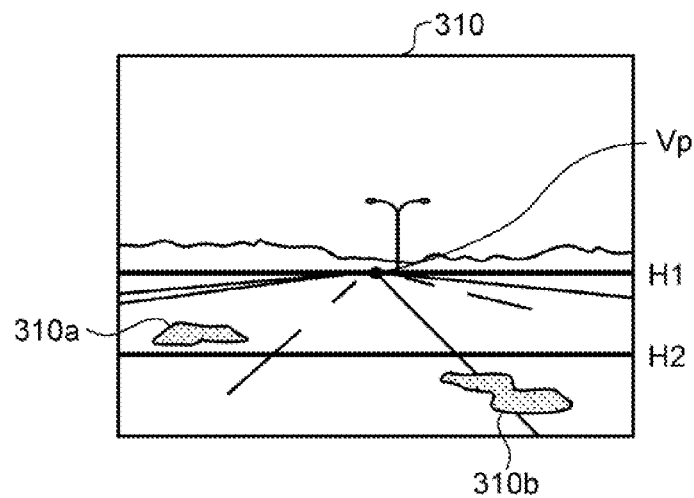
FIG. 5 is a view illustrating a configuration example of decision pattern data.
FIG. 6 is a view illustrating an example of a road image.

FIG. 5 is a view illustrating a configuration example of decision pattern data. As illustrated in FIG. 5, the decision pattern data 13d includes items of "vertical G", "sound", "image" and "decision". The item of vertical G is an area which stores a decision condition related to abnormality of vertical G. The item of the sound is an area which stores a decision condition related to abnormality of the sound. The item of the image is an area which stores a decision condition related to abnormality of the sound. The item of decision is an area which stores a decision result. The items of vertical G, the sound and the image include "1" in case of the decision condition that abnormality occurs and is left blank in case of the decision result that abnormality does not occur. The item of decision includes "established" when it is decided that deterioration occurs, stores "?" when whether or not deterioration occurs is not determined and is left blank when it is decided that deterioration does not occur.

With an example of FIG. 5, as indicated by a pattern 1, when vertical G, the sound and the image are "1" and abnormality is detected from all of vertical G, the sound and the image, it is decided that deterioration occurs. Further, as indicated by a pattern 2, when vertical G and the image are "1", abnormality is detected from vertical G and the image, it is decided that whether or not abnormality occurs is not determined. Furthermore, as indicated by a pattern 3, when the sound and the image are "1" and abnormality is detected from the sound and the image, it is decided that whether or not abnormality occurs is not determined. Still further, as indicated by a pattern 4, when vertical G is "1" and abnormality is detected only in vertical G, it is decided that whether or not abnormality occurs is not determined. Moreover, as indicated by a pattern 5, when the sound is "1" and abnormality is detected only in the sound, it is decided that whether or not abnormality occurs is not determined. Moreover, as indicated by a pattern 6, when the image is "1" and abnormality is detected only in the image, it is decided that whether or not abnormality occurs is not determined.

The control unit 15 includes an internal memory which stores a program and control data which defines various processing procedures, and executes various processings. As illustrated in FIG. 3, the control unit 15 has the registering unit 15a, the abnormal area detecting unit 15b, the running sound abnormality detecting unit 15c, the acceleration abnormality detecting unit 15d, the specifying unit 15e and a output unit 15f.

Of these components, the registering unit 15a is a processing unit which registers video data, wheel trajectory data and sensing data uploaded from the simple device 30, in the memory unit 13. According to one embodiment, the registering unit 15a registers video data in the memory unit 13 per car number of the patrol car 3 when the reader/writer 11 reads the video data from the memory card 20. According to another embodiment, when receiving sensing data from the simple device 30, the registering unit 15a registers the sensing data in the memory unit 13 per car number of the patrol car 3.

The abnormal area detecting unit 15b is a processing unit which detects an abnormal area of pavement of a road surface from the road surface on a road image using the video data 13a.

According to the first aspect, the abnormal area detecting unit 15b activates processing when the new video data 13a is registered in the memory unit 13. First, the abnormal area detecting unit 15b sequentially reads a frame of the road image included in the video data 13a stored in the memory unit 13. Further, the abnormal area detecting unit 15b specifies an area of the road image which is a target for executing image processing. For example, the abnormal area detecting unit 15b calculates a predetermined rate of a height H1 of a vanishing point Vp obtained in advance by calibration at an angle of field of the camera 31 in the road image such as a height H2 which is half the height H1. Further, the abnormal area detecting unit 15b executes subsequent image processing by focusing on an area E of the road image with a height equal to or less than the height H2 calculated in advance.

Thus, an image processing execution target area is limited to remove an area which is close to a vanishing point on a road image and which is represented small, from the image processing execution target, and reduce the computation amount of image processing. In addition, an area of a road image with a height equal to or less than the height H2 is referred to as an "image processing execution target area".

Then, the abnormal area detecting unit 15b detects an abnormal area which can be estimated to include a change in color on pavement of a road surface, from an image processing execution target area E specified in advance. For example, the abnormal area detecting unit 15b calculates an average value of a chroma or a color hue of each pixel in the image processing execution target area E. Further, the abnormal area detecting unit 15b extracts pixels which have a color difference equal to or more than a predetermined threshold $\Delta a$ between the average value of the chroma or the color hue of each pixel, and labels an area in which pixels having the color difference equal to or more than the threshold $\Delta a$ continue. Labeling the area allows the abnormal area detecting unit 15b to detect an abnormal area in which a color of an asphalt or cement is estimated to change.

Further, the abnormal area detecting unit 15b calculates the number of pixels forming an abnormal area, that is, the area of the abnormal area, and decides whether the area of the abnormal area is the predetermined $\Delta b$ or more. In this case, the abnormal area detecting unit 15b can also calculate the area of the abnormal area by increasing a weight with respect to pixels which are closer to a vanishing point among pixels forming the abnormal area. By deciding the size of such an area, the abnormal area detecting unit 15b decides whether or not an abnormal area has a size which is estimated to be a dent, a track or a crack of a road surface, in other words, whether or not an abnormal area is, for example, pebbles.

Further, when the area of the abnormal area is less than a predetermined threshold $\Delta b$, it is possible to estimate that an abnormal area is less likely to be a dent, a track and a crack of a road surface. Hence, the abnormal area detecting unit 15b does not execute the following processing. Meanwhile, when the area of the abnormal area is the predetermined threshold $\Delta b$ or more, it is possible to estimate that an abnormal area is highly likely to be a dent, a track and a crack of the road surface. Hence, the abnormal area detecting unit 15b further decides whether or not an average value of brightness of pixels forming the abnormal area is a predetermined threshold $\Delta c$ or less. By deciding the size of such brightness, the abnormal area detecting unit 15b can decide whether or not an abnormal area is black to such an extent that it is possible to estimate that the abnormal area is different from a road sign such as white lines applied to a road surface. When the average value of brightness of pixels forming an abnormal area is a predetermined $\Delta c$ or less, the abnormal area detecting unit 15b decides that the abnormal area is abnormal.

Hereinafter, a specific example of a method of detecting abnormality from a road image will be described using FIG. 6. FIG. 6 is a view illustrating an example of a road image. With an example illustrated in FIG. 6, in an abnormal area 310a and an abnormal area 310b of a road image 310, a color difference between the average value of the chroma or the color hue of each pixel is the predetermined threshold $\Delta a$ or more. The abnormal area detecting unit 15b specifies an area with the height H2 which is half the height H1 of the vanishing point Vp as the image processing execution target area E to detect the abnormal area. In this image processing execution target area E, only the abnormal area 310b of the abnormal area 310a and the abnormal area 310b is included, and therefore the abnormal area 310b is detected by the abnormal area detecting unit 15b. When the area of the abnormal area 310b is the predetermined threshold $\Delta b$ or more and the average value of brightness of pixels forming the abnormal area 310b is the predetermined threshold $\Delta c$ or less, the abnormal area detecting unit 15b detects that abnormality is caused by convexities and concavities such as a dent, a track and a crack.

The abnormal area detecting unit 15b specifies an image capturing date of a captured image when abnormality is detected from the captured image. When, for example, the video data 13a stores a time stamp per frame, the abnormal area detecting unit 15b specifies as an image capturing date the date of a time stamp of a frame image in which abnormality is detected. Meanwhile, when the video date 13a stores the image capturing start date and an elapsed time per frame, the abnormal area detecting unit 15b specifies as the image capturing date a date which is a time elapsed from an image capturing start date to a frame of the captured image in which abnormality is detected. Further, the abnormal area detecting unit 15b calculates the position at a measuring date corresponding to the image capturing date of the captured image in which abnormality is detected, from position data included in the sensing data 13b. The abnormal area detecting unit 15b maps the calculated position on a map, and specifies a road and a car lane which are beyond the position. Such map information may be registered in the memory unit 13 in advance. Further, the map information may be adequately acquired from a server of a provider who provides a service for providing map information. The abnormal area detecting unit 15b sets the specified road to the item of the route, the specified car lane to the item of the car lane, an identification code or coordinate values indicating the position at which abnormality is detected to the item of the spot, the image capturing date to the item of the date and "1" to the item of the image to register in the abnormality position data 13c. In addition, when records of the road, the car lane and the spot to register already exist in the abnormality position data 13c, the abnormal area detecting unit 15b updates the item of the image of the record to "1".

The running sound abnormality detecting unit 15c is a processing unit which detects abnormality on pavement of a road surface using sound data included in the sensing data 13b.

According to the first aspect, the running sound abnormality detecting unit 15c activates processing when the new sensing data 13b is registered in the memory unit 13. First, the abnormal area detecting unit 15b starts reading sequentially from the head of the sound data included in the sensing data 13b stored in the memory unit 13. Further, the running sound abnormality detecting unit 15c decides whether or not a characteristic voice pattern of deterioration which occurs when a car runs on a dent, a track or a crack is included in the read sound data. For example, the running sound abnormality detecting unit 15c extracts characteristic points of sound data obtained by frequency-resolving the voice indicated by the read sound data. Further, the running sound abnormality detecting unit 15c calculates a similarity between the extracted characteristic point and a characteristic point of a sound pattern of deterioration, decides whether or not the similarity is a predetermined threshold or more and, when the similarity is the threshold or more, detects that there is abnormality on the pavement of the road surface.

When detecting abnormality from sound data, the running sound abnormality detecting unit 15c specifies a recording date of the sound data. For example, the running sound abnormality detecting unit 15c specifies as a recording date a date which is the time elapsed from the recording start date of the sound data at a position at which abnormality is detected. Further, the running sound abnormality detecting unit 15c calculates a position at a measuring date corresponding to a recording date on which abnormality in sound data is detected, from position data included in the sensing data 13b. The running sound abnormality detecting unit 15c maps the calculated position on a map, and specifies a road and a car lane which are beyond the position. The running sound abnormality detecting unit 15c sets the specified road to the item of the route, the specified car lane to the item of the car lane distinction, the identification code or the coordinate values indicating the position at which abnormality is detected, to the item of the spot, the recording date to the item of the date and "1" to the item of the sound to register in the abnormality position data 13c. In addition, when records of a road, a car lane and a spot to register already exist in the abnormality position data 13c, the running sound abnormality detecting unit 15c updates the item of the sound of the record to "1".

The acceleration abnormality detecting unit 15d is a processing unit which detects abnormality on pavement of a road surface using acceleration data included in the sensing data 13b.

According to the first aspect, the acceleration abnormality detecting unit 15d activates processing when the new sensing data 13b is registered in the memory unit 13. First, the acceleration abnormality detecting unit 15d starts reading per predetermined section sequentially from the head of the acceleration data included in the sensing data 13b stored in the memory unit 13. Further, the running sound abnormality detecting unit 15c decides whether or not one of a maximum value and a minimum value of a gravitational acceleration in the read section is outside a predetermined range R. That the acceleration is outside the predetermined range R means that a car has passed some difference in step. The acceleration abnormality detecting unit 15d detects abnormality on pavement of a road surface when one of the maximum value and the minimum value of the gravitational acceleration is outside the predetermined range R. By deciding the acceleration in this way, it is possible to decide whether an abnormal area detected from a road image is convexities and concavities such as a dent, a track and a crack, in other words, a change in color such as a pool with little convexities and concavities.

When detecting abnormality from acceleration data, the acceleration abnormality detecting unit 15d specifies the measurement date of the acceleration data. When, for example, the acceleration data stores a time stamp every time the gravitational acceleration is measured, the acceleration abnormality detecting unit 15d specifies the date of the time stamp and the measurement date at the acceleration at which abnormality is detected. Further, when the acceleration data stores a measurement start date and an elapsed time every time a gravitational acceleration is measured, the acceleration abnormality detecting unit 15d specifies as a measurement date a date which is the time elapsed from the measurement start date to the time to reach the acceleration at which abnormality is detected. Furthermore, the acceleration abnormality detecting unit 15d calculates the position at the measuring date corresponding to the measurement date on which abnormality in acceleration data is detected, from position data included in the sensing data 13b. The acceleration abnormality detecting unit 15d maps the calculated position on a map, and specifies a road and a car lane which are beyond the position. The acceleration abnormality detecting unit 15d sets the specified road to the item of the route, the specified car lane to the item of the car lane distinction, an identification code or coordinate values indicating the position at which abnormality is detected, to the item of the spot, the measurement date to the item of the date and "1" to the item of vertical G to register in the abnormality position data 13c. In addition, when records of a road, a car lane and a spot to register already exist in the abnormality position data 13c, the acceleration abnormality detecting unit 15d updates the item of vertical G of the record to "1".

The specifying unit 15e is a processing unit which specifies a position at which deterioration is not detected from part of detection results of the camera 31, the G sensor 32 and the microphone 34. According to the first aspect, the specifying unit 15e specifies a position at which abnormality is detected in one or two of the camera 31, the G sensor 32 and the microphone 34. For example, the specifying unit 15e compares the items of "vertical G", "sound" and "image" of each record stored in the abnormality position data 13c and each pattern of the decision pattern data 13d, and decides whether or not deterioration occurs. Further, the specifying unit 15e specifies a position at which it is decided that whether or not deterioration occurs is not determined as a result of decision.

The output unit 15f is a processing unit which outputs information for instructing a resurvey. According to the first aspect, the output unit 15f generates screen information of a resurvey instruction screen which maps on a map a position at which the specifying unit 15e decided whether or not deterioration occurs is not determined, as information for instructing a resurvey according to a browsing request from the service subscriber terminal 50. In this case, the output unit 15f maps a position according to a different display mode depending on vertical G, a sound and an image in which abnormality is not detected. Further, the output unit 15f outputs the generated screen information to the service subscriber terminal 50, and displays the resurvey instruction screen.

Figure 7:
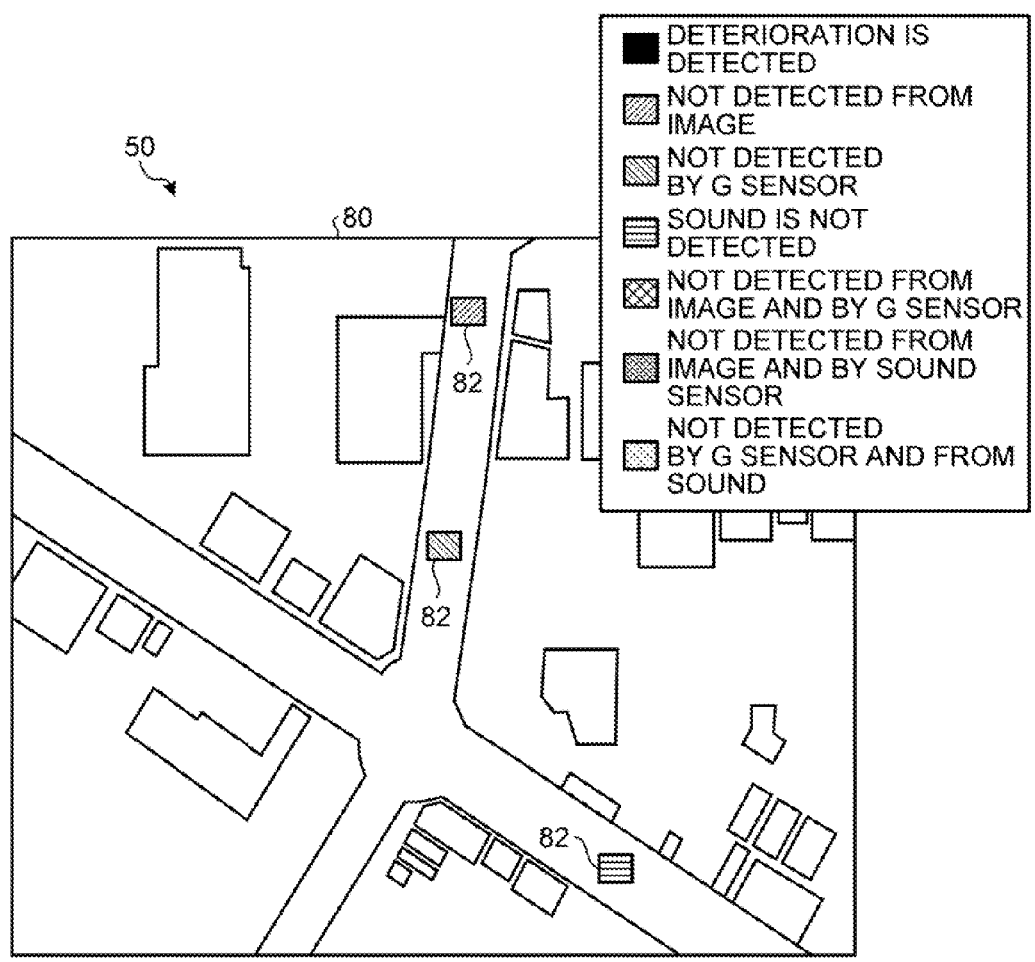
FIG. 7 is a view illustrating an example of a resurvey instruction screen.

FIG. 7 is a view illustrating an example of the resurvey instruction screen. As illustrated in FIG. 7, the service subscriber terminal 50 displays a resurvey instruction screen 80 in which the position at which it is decided that whether or not deterioration occurs is not determined is mapped on a map. The resurvey instruction screen 80 indicates positions mapped on the map by marks 82. Further, with an example of FIG. 7, patterns of the marks 82 are changed according to vertical G, a sound and an image from which abnormality is not detected, and is displayed identifiably. In addition, a color and a shape of the marks 82 may be changed according to vertical G, a sound and an image from which abnormality is not detected. The resurvey instruction screen 80 is displayed in this way, so that a road researcher can visually and geographically learn spots to be resurveyed.

Flow of Processing

Figure 8:
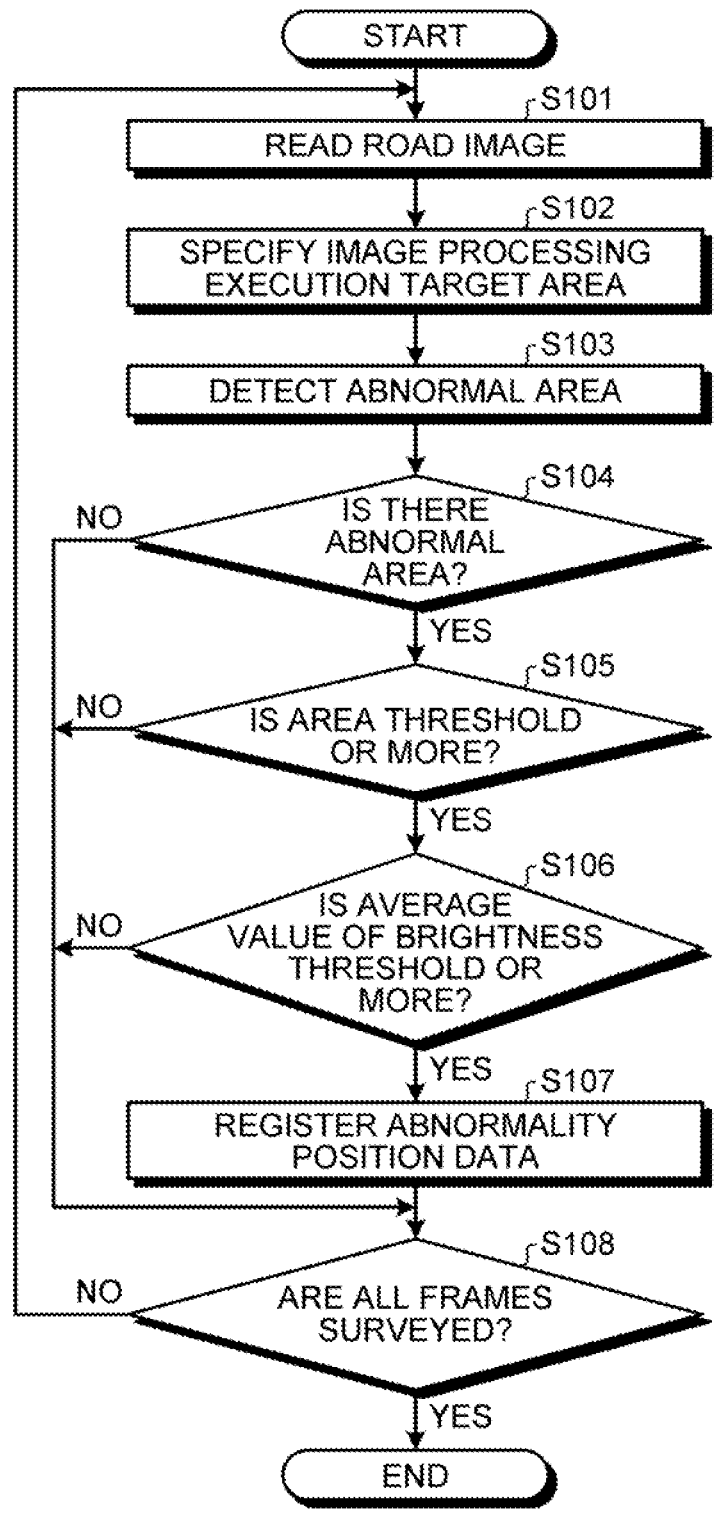
FIG. 8 is a flowchart illustrating procedure of abnormal area detection processing.

Next, a flow of processing of the road surface survey device 10 according to the present embodiment will be described. FIG. 8 is a flowchart illustrating procedure of abnormal area detection processing. This abnormal area detection processing is activated when the new video data 13a is registered in the memory unit 13.

As illustrated in FIG. 8, the abnormal area detecting unit 15b sequentially reads a frame of a road image included in the video data 13a stored in the memory unit 13 (step S101). Further, the abnormal area detecting unit 15b specifies the image processing execution target area E based on a vanishing point on the road image (step S102). Then, the abnormal area detecting unit 15b detects an abnormal area which is estimated to include, for example, a change in color on pavement of a road surface from the image processing execution target area E specified in advance (step S103).

Further, when there is an abnormal area (Yes in step S104), the abnormal area detecting unit 15b calculates the number of pixels forming the abnormal area, that is, the area of the abnormal area, and decides whether or not the area of the abnormal area is the predetermined threshold Δb or more (step S105).

In this case, when there is no abnormal area (No in step S104) or the area of the abnormal area is less than the predetermined threshold Δb (No in step S105), it is possible to estimate that the abnormal area is little likely to be a dent, a track or a crack on a road surface. Hence, step proceeds to processing in step S108 by skipping processing in subsequent step S106.

Meanwhile, when the area of the abnormal area is the predetermined threshold Δb or more (Yes in step S105), it is possible to estimate that the abnormal area is highly likely to be a dent, a track or a crack on the road surface. Hence, the abnormal area detecting unit 15b further decides whether or not the average value of brightness of pixels forming the abnormal area is the predetermined threshold Δc or less (step S106).

Further, when the average value of brightness of pixels forming the abnormal area is the predetermined threshold Δc or less (Yes in step S106), the abnormal area detecting unit 15b executes the following processing. That is, the abnormal area detecting unit 15b registers information related to a position at which abnormality is detected, in the abnormality position data 13c (step S107). In addition, when the average value of brightness of pixels forming the abnormal area is larger than the predetermined threshold Δc (No in step S106), the step also proceeds to processing in step S108 by skipping processing in step S107.

The abnormal area detecting unit 15b decides whether or not a survey of a road surface in all frames of the road image included in the video data 13a is finished (step S108). When the survey is not finished (No in step S108), the abnormal area detecting unit 15b repeatedly executes processings in step S101 to step S107 until the survey of the road surface in all frames is finished. Further, the abnormal area detecting unit 15b finishes processing when a survey of a road surface in all frames is finished (Yes in step S108).

Figure 9:
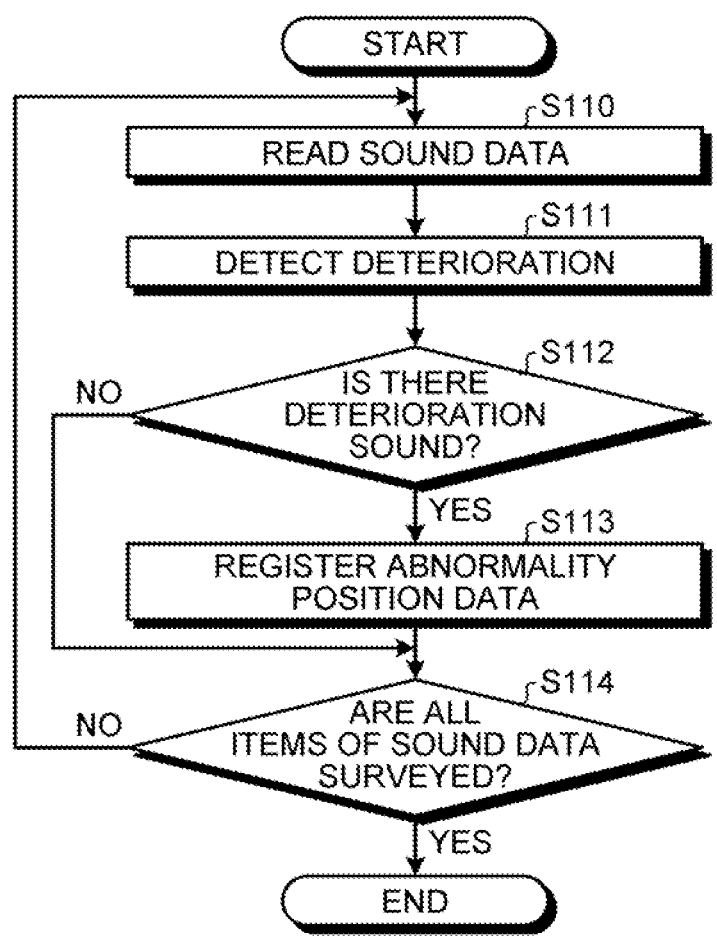
FIG. 9 is a flowchart illustrating procedure of running sound abnormality detection processing.

Next, a flow of running sound abnormality detection processing of the road surface survey device 10 according to the present embodiment will be described. FIG. 9 is a flowchart illustrating procedure of the running sound abnormality detection processing. This running sound abnormality detection processing is activated when the new sensing data 13b is registered in the memory unit 13.

As illustrated in FIG. 9, the running sound abnormality detecting unit 15c sequentially reads sound data included in the sensing data 13b stored in the memory unit 13 (step S110). Further, the running sound abnormality detecting unit 15c detects abnormality by recognizing a sound pattern of deterioration, in the read sound data (step S111). The running sound abnormality detecting unit 15c decides whether or not abnormality is detected as a result of detection (step S112). When abnormality is detected (Yes in step S112), the running sound abnormality detecting unit 15c registers information related to a position at which abnormality is detected, in the abnormality position data 13c (step S113). In addition, when abnormality is not detected (No in step S112), the step proceeds to processing in step S114 by skipping processing in step S113.

The running sound abnormality detecting unit 15c decides whether or not a resurvey of a road surface for sound data is finished (step S114). When a survey is not finished (No in step S114), the running sound abnormality detecting unit 15c repeatedly executes processing in step S110 to step S113 until a survey of a road surface for the sound data is finished. Further, the running sound abnormality detecting unit 15c finishes processing when the survey of the road surface for the sound data is finished (Yes in step S114).

Figure 10:
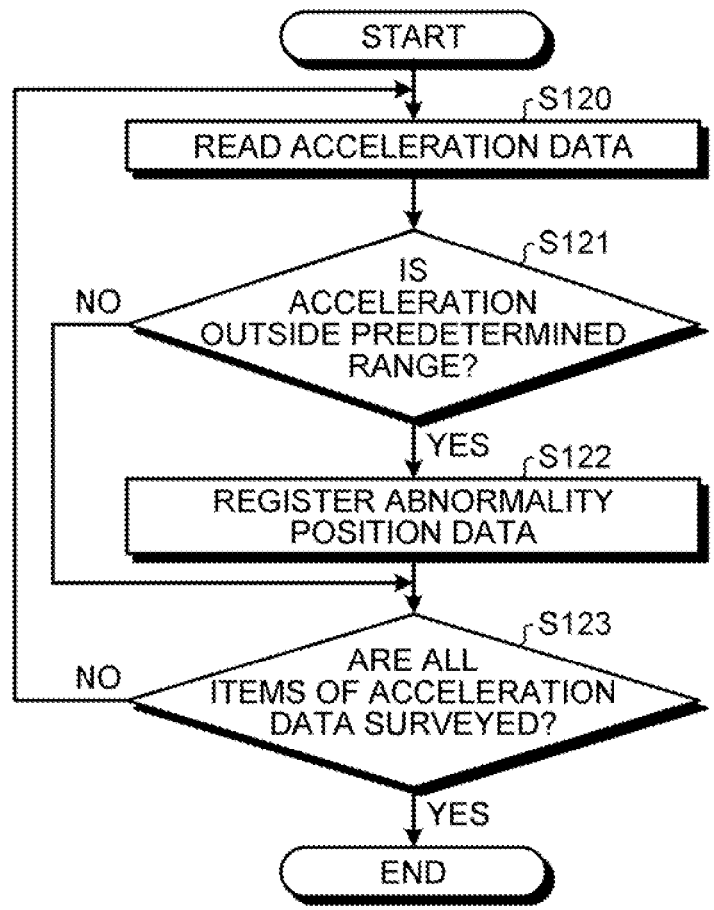
FIG. 10 is a flowchart illustrating procedure of acceleration abnormality detection processing.

Next, a flow of acceleration abnormality detection processing of the road surface survey device 10 according to the present embodiment will be described. FIG. 10 is a flowchart illustrating procedure of the acceleration abnormality detection processing. This acceleration abnormality detection processing is activated when the new sensing data 13b is registered in the memory unit 13.

As illustrated in FIG. 10, the acceleration abnormality detecting unit 15d sequentially reads per predetermined section acceleration data included in the sensing data 13b stored in the memory unit 13 (step S120). Further, the acceleration abnormality detecting unit 15d decides whether or not one of the maximum value and the minimum value of the gravitational acceleration in the read section is outside the predetermined range R (step S121). When one of the maximum value and the minimum value is outside the predetermined range R (Yes in step S121), the acceleration abnormality detecting unit 15d registers in the abnormality position data 13c information related to a position at which abnormality is detected after one of the maximum value and the minimum value is outside the predetermined range R (step S122). In addition, when abnormality is not detected (No in step S121), the step proceeds to step S123 by skipping processing in step S122.

The acceleration abnormality detecting unit 15d decides whether or not a survey of a road surface for acceleration data is finished (step S123). When the survey is not finished (No in step S123), the acceleration abnormality detecting unit 15d repeatedly executes processing in step S120 to step S122 until the survey of the road surface for the acceleration data is finished. Further, the acceleration abnormality detecting unit 15d finishes processing when the survey of the road surface for the acceleration data is finished (Yes in step S123).

Figure 11:
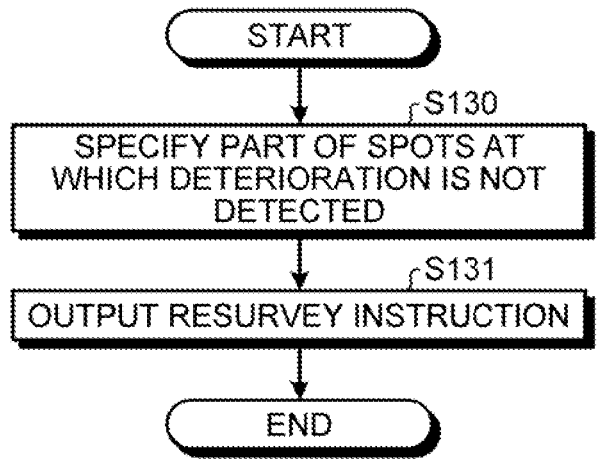
FIG. 11 is a flowchart illustrating procedure of resurvey instruction processing.

Next, a flow of resurvey instruction processing of the road surface survey device 10 according to the present embodiment will be described. FIG. 11 is a flowchart illustrating procedure of the resurvey instruction processing according to the first embodiment. This resurvey instruction processing is activated when a browsing request is received from the service subscriber terminal 50.

As illustrated in FIG. 11, the specifying unit 15e decides whether or not each record stored in the abnormality position data 13c matches one of patterns of the decision pattern data 13d, and specifies a position at which it is decided that whether or not deterioration occurs is not determined (step S130).

The output unit 15f generates screen information of a resurvey instruction screen in which the position at which the specifying unit 15e decides that whether or not deterioration occurs is not determined is mapped on a map, outputs the generated screen information to the service subscriber terminal 50 (step S131) and finishes processing.

Effect of First Embodiment

As described, with the road surface survey device 10 according to the present embodiment, one or two positions at which abnormality is detected are specified among positions at which abnormality is detected by the camera 31, the G sensor 32 and the microphone 34. Further, the road surface survey device 10 according to the present embodiment outputs an instruction of a resurvey of the specified position. Thus, the road surface survey device 10 according to the present embodiment outputs an instruction of a resurvey by indicating a position at which it is not possible to determine whether or not deterioration occurs, so that a researcher can learn the position to be resurveyed and efficiently resurvey deterioration of the road surface. Further, the road surface survey device 10 according to the present embodiment outputs an instruction of a resurvey by indicating a position at which it is not possible to determine whether or not deterioration occurs, so that it is possible to detect deterioration of the road surface at an early stage. By this means, the road surface survey device 10 according to the present embodiment can detect deterioration of a road surface at an early stage, so that it is possible to reduce cost for repairing roads.

Further, the road surface survey device 10 according to the present embodiment further outputs an instruction of a resurvey of abnormality which is not detected at the specified position. By this means, the road surface survey device 10 according to the present embodiment can learn which abnormality the researcher is not capable of detecting, and, consequently, resurvey deterioration of a road surface efficiently.

[b] Second Embodiment

Next, a second embodiment will be described. Configurations of a road surface survey system 1 and a simple device 30 according to the second embodiment are the same as in a road surface survey system 1 and a simple device 30 according to the first embodiment illustrated in FIGS. 1 and 2, and therefore will not be described.

Figure 12:
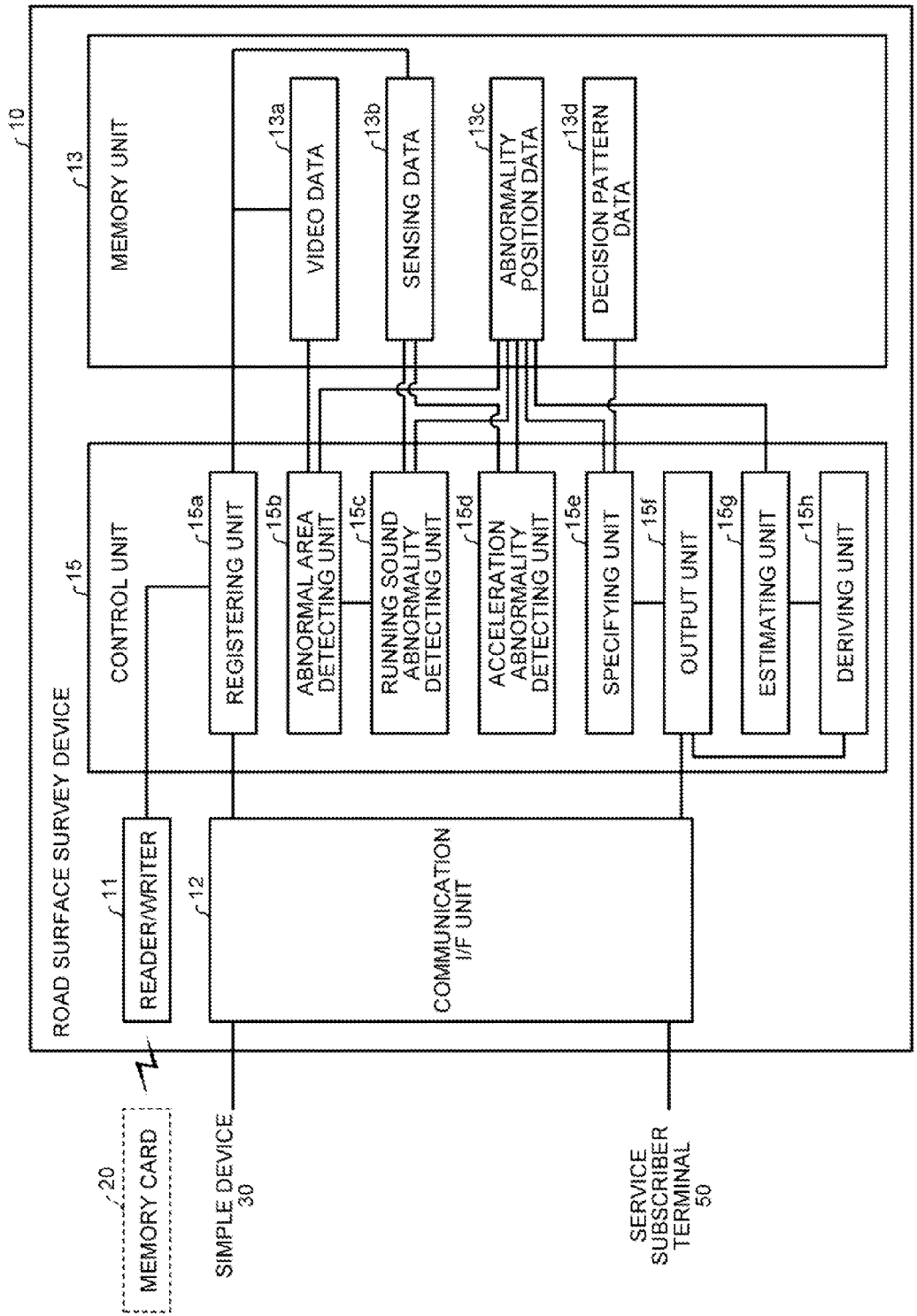
FIG. 12 is a block diagram illustrating a functional configuration of a road surface survey device according to a second embodiment.

FIG. 12 is a block diagram illustrating a functional configuration of a road surface survey device according to the second embodiment. The configuration of a road surface survey device 10 according to the second embodiment is substantially the same as the road surface survey device 10 according to the first embodiment illustrated in FIG. 3, and therefore differences will be described. As illustrated in FIG. 12, a control unit 15 further has an estimating unit 15g and a deriving unit 15h.

The estimating unit 15g is a processing unit which estimates a cause that abnormality is not detected when abnormality is detected only in part of vertical G, a sound and an image. According to the first aspect, the estimating unit 15g executes, for example, the following processing when abnormality is not detected in an image. That is, the estimating unit 15g performs image processing of detecting a number plate from the image. The number plate has a rectangular shape, and the size thereof is also determined. Consequently, for example, the estimating unit 15g can detect the number plate from the image by matching a pattern using a template matching an outer shape of the number plate. When the number plate is included in the image, it is estimated that a patrol car 3 is in a congested situation in which a distance between cars is short when running on a road. Hence, the estimating unit 15g estimates that congestion of the road is the cause when the number plate can be detected from the image. Further, the estimating unit 15g performs image processing of detecting whether or not there is sunshine in an image. When an image is captured at night or under a bad weather, the image is dark and unclear. Hence, the estimating unit 15g calculates the maximum value and the average value which are values indicating lightness of an image such as brightness or luminance of the image. Further, the estimating unit 15g estimates that the cause is lack of sunshine when the maximum value and the average value are smaller than each predetermined threshold which is regarded as lack of sunshine. Furthermore, the estimating unit 15g performs image processing of detecting the weather in the image. When it is cloudy or rainy upon image capturing, an image includes more gray portions and is not clear. Hence, the estimating unit 15g detects a tinge of a color of the image, and estimates that the bad weather is the cause when the gray portion is a predetermined amount or more or a predetermined rate or more.

Further, according to another aspect, the estimating unit 15g executes, for example, the following processing when abnormality is not detected in vertical G. That is, the estimating unit 15g performs image processing of detecting a car speed of the patrol car 3 obtained from an optical flow between frames of a road image. When the speed of the patrol car 3 is slow, the patrol car 3 slowly passes over convexities and concavities, and therefore a change in the gravitational acceleration is little. Hence, the estimating unit 15g detects the car speed of the patrol car 3 and estimates that the low speed is the cause when the car speed of the patrol car 3 is slower than a predetermined speed at which it is difficult to detect deterioration based on the gravitational acceleration.

The estimating unit 15g registers in the memory unit 13 information indicating the cause estimated at each position at part of which abnormality is only detected. According to the first aspect, the estimating unit 15g registers in abnormality position data 13c the cause estimated at each position at part of which abnormality is only detected.

FIG. 13 is a view illustrating a configuration example of abnormality position data according to the second embodiment. A configuration of the abnormality position data 13c according to the second embodiment is substantially the same as abnormality position data 13c according to the first embodiment illustrated in FIG. 4, and therefore differences will be described.

As illustrated in FIG. 13, the abnormality position data 13c includes an item of "estimated cause". The item of the estimated cause is classified into "lack of field of view", "lack of sunshine", "bad weather" and "low speed". The lack of the field of view is an area which stores information indicating that the cause is congestion of a road and therefore the field of view lacks. The lack of sunshine is an area which stores information indicating that the cause is the lack of sunshine. The bad weather is an area which stores information indicating that the cause is the bad weather. The low speed is an area which stores information indicating that the cause is the low speed. Each item of the lack of the field of view, the lack of sunshine, the bad weather and the low speed includes "1" when each item is estimated to be the cause, and is left blank when each item is not estimated to be the cause.

With an example in FIG. 13, a spot "AY23" of an "inbound" car lane of a road "AY" indicates that the cause that abnormality is detected only in acceleration data is lack of the field of view. Further, a spot "AY24" of the "inbound" car lane of the road "AY" indicates that the cause that abnormality is detected only in sound data is lack of sunshine. Furthermore, a spot "AY25" of the "inbound" car lane of the road "AY" indicates that the cause that abnormality is detected only in an image is a low speed. Still further, a spot "AY31" of the "inbound" car lane of the road "AY" indicates that the cause that abnormality is detected only in vertical G is the bad weather.

The deriving unit 15h is a processing unit which estimates conditions that abnormality can be detected. According to the first aspect, the deriving unit 15h derives the conditions that abnormality which is not detected while evading the estimated cause can be detected. When, for example, the cause is lack of the field of view, the deriving unit 15h derives a deserted road as a resurvey condition. Further, when the cause is lack of sunshine, the deriving unit 15h derives availability of sunshine as a resurvey condition. Furthermore, when the cause is the bad weather, the deriving unit 15h derives a sunny day as a resurvey condition. Still further, when the cause is the low speed, the deriving unit 15h derives running at a predetermined speed or more at which deterioration can be detected based on the gravitational acceleration, as a resurvey condition.

The output unit 15f further outputs a resurvey condition as information for instruction of a resurvey. According to the first aspect, the output unit 15f generates screen information of a resurvey instruction screen which displays, for example, a symbol and a message indicating a resurvey condition in association with a position which needs to be resurveyed and outputs the screen information to the service subscriber terminal 50, and makes the service subscriber terminal 50 display the resurvey instruction screen. The resurvey instruction screen 80 is displayed in this way, so that a road researcher can learn under what condition a resurvey of a spot to be resurveyed needs to be performed to obtain information for deciding whether or not deterioration occurs.

Figure 14:
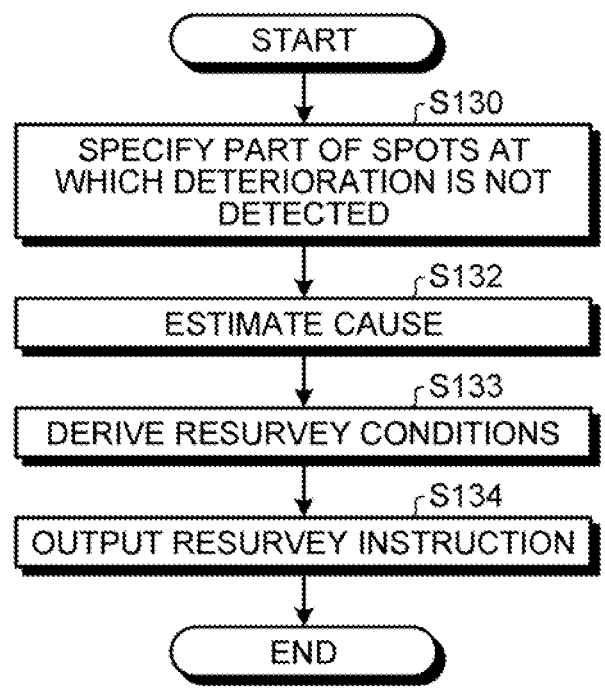
FIG. 14 is a flowchart illustrating procedure of resurvey instruction processing according to the second embodiment.

FIG. 14 is a flowchart illustrating procedure of resurvey instruction processing according to the second embodiment. In addition, the same portions as in the resurvey instruction processing according to the first embodiment illustrated in FIG. 11 will be assigned the same reference numerals, and will not be described.

As illustrated in FIG. 14, the estimating unit 15g estimates for a position at which abnormality is not detected in part of vertical G, a sound and an image a cause that abnormality is not detected based on a captured image (step S132). The deriving unit 15h derives the resurvey condition matching the estimated cause (step S133). The output unit 15f generates screen information of a resurvey instruction screen which displays, for example, a symbol and a message indicating the resurvey condition in association with the position which needs to be resurveyed, outputs the generated screen information to the service subscriber terminal 50 (step S134) and finishes processing.

Effect of Second Embodiment

As described above, the road surface survey device 10 according to the present embodiment estimates a cause that abnormality is not detected at the position specified from the captured image, and derives a condition that abnormality which is not detected while evading the estimated cause can be detected. Further, the road surface survey device 10 according to the present example outputs the derived condition as the resurvey instruction. By this means, with the road surface survey device 10 according to the present embodiment, a researcher can learn under what condition a resurvey needs to be conducted in order to detect abnormality which is not detected, and efficiently resurvey deterioration of a road surface.

[c] Third Embodiment

Next, a third embodiment will be described. Configurations of a road surface survey system 1 and a simple device 30 according to the third embodiment are the same as in a road surface survey system 1 and a simple device 30 according to the first embodiment illustrated in FIGS. 1 and 2, and therefore will not be described.

FIG. 15 is a block diagram illustrating a functional configuration of a road surface survey device according to the third embodiment. The configuration of the road surface survey device 10 according to the third embodiment is substantially the same as in a road surface survey device 10 according to the second embodiment illustrated in FIG. 12, and therefore differences will be described. A memory unit 13 further stores traffic prediction data 13e, sunshine data 13f, weather prediction data 13g and resurvey schedule data 13h. Further, a control unit 15 has a selecting unit 15i.

The traffic prediction data 13e is data which represents a predicted traffic of a road. With one example, the selecting unit 15i refers to the traffic prediction data 13e to select a resurvey time schedule. This traffic prediction data 13e may be adequately acquired from a server of a provider who provides service for providing a predicted traffic of each road, and used. Further, an administrator may register the traffic prediction data 13e from an input unit which is not illustrated or from a terminal device such as a client computer which can communicate with the road surface survey device 10.

FIG. 16 is a view illustrating a configuration example of traffic prediction data. As illustrated in FIG. 16, the traffic prediction data 13e includes items of "prediction day", "route", "car lane distinction" and "time zone". The item of the time zone is classified into "morning" and "afternoon". The prediction day is an area which stores the date on which the traffic is predicted. The route is an area which stores information indicating a road. The car lane distinction is an area which stores information indicating a car lane of a road. With the present example, whether the car lane of the road is an inbound car lane or an outbound car lane is identified, and "inbound" is stored in case of the inbound car lane and "outbound" is stored in case of the outbound car lane. The item of the morning is an area which stores information indicating the traffic predicted in the morning. The item of the afternoon is an area which stores information indicating the traffic predicted in the afternoon. The items of the morning and the afternoon include "deserted" when the traffic is little, include "congested" when the traffic is great and is left blank when the traffic is not predicted.

With an example of FIG. 16, an "inbound" car lane of a road "AA" on January 9 indicates that the traffic is great in the morning and the traffic is not predicted in the afternoon. Further, the "outbound" car lane of the road "AA" indicates that the traffic is little and deserted in the morning and the traffic is not predicted in the afternoon. Furthermore, the "inbound" car lane of the road "AY" indicates that the traffic is little in the morning and the traffic is not predicted in the afternoon.

The sunshine data 13f is data which represents a period in which sunshine suitable for image capturing is obtained. With one example, the selecting unit 15i refers to the sunshine data 13f to select a resurvey time schedule. This sunshine data 13f may be adequately acquired from a server of a provider who provides service for providing a period in which sunshine is obtained, and used. Further, the administrator may register the sunshine data 13f from an input unit which is not illustrated or a terminal device such as a client computer which can communicate with the road surface survey device 10.

FIG. 17 is a view illustrating a configuration example of sunshine data. As illustrated in FIG. 17, the sunshine data 13f includes items of "period" and "sunshine time zone". The item of the sunshine time zone is classified into "sunshine start" and "sunshine end". The period is an area which stores information indicating a period in which sunshine is obtained. The sunshine start is an area which stores information indicating a sunshine start time. The sunshine end is an area which stores information indicating a sunshine end time. With an example of FIG. 17, sunshine starts at 9:00 and ends at 17:00 on January 9.

The weather prediction data 13g is data which represents a predicted weather. With one example, the selecting unit 15i refers to the weather prediction data 13g to select a resurvey time schedule. This weather prediction data 13g may be adequately acquired from a server of a provider who provides service for providing a weather forecast and used. Further, the administrator may register the weather prediction data 13g from an input unit which is not illustrated or from a terminal device such as a client computer which can communicate with the road surface survey device 10.

FIG. 18 is a view illustrating a configuration example of weather prediction data. As illustrated in FIG. 18, the weather prediction data 13g includes items of "date" and "weather". The date is an area which stores a date on which the weather is predicted. The weather is an area which stores information indicating the predicted weather. With an example of FIG. 18, the predicted weather is sunny and then rainy on January 9.

The resurvey schedule data 13h is data which represents a resurvey schedule. With one example, the selecting unit 15i registers a resurvey time schedule in the resurvey schedule data 13h. With another example, the output unit 15f refers to the resurvey schedule data 13h to indicate the resurvey schedule.

FIG. 19 is a view illustrating a configuration example of resurvey schedule data. As illustrated in FIG. 19, resurvey schedule data 13h includes items of "route", "car lane distinction" and "car allocation plan". The item of the car allocation plan is classified into "car number", "departure day" and "departure time". The route is an area which stores information indicating a road in which abnormality is detected. The car lane distinction is an area which stores information indicating a car lane of a road from which abnormality is detected. The item of the car number is an area which stores information indicating a car which is scheduled to perform a survey. The item of the departure day is an area which stores a date on which a survey is scheduled. The item of the departure time is an area which stores a departure time of a survey.

With an example in FIG. 19, an "inbound" car lane of a route "AA" indicates that "car No. 32" is scheduled to depart for a resurvey at "12:00" on "January 11". Further, an "outbound" car lane of the route "AA" indicates that "car No. 68" is scheduled to depart for a resurvey at "10:00" on "January 12". Furthermore, the "inbound" car lane of a route "AY" indicates that "car No. 23" is scheduled to depart for a resurvey at "9:00" on "January 20".

Back to FIG. 15, a selecting unit 15i is a processing unit which selects a time schedule on which a resurvey is conducted. According to the first aspect, the selecting unit 15i selects a time schedule matching conditions that abnormality which is derived by a deriving unit 15h from traffic prediction data 13e, sunshine data 13f, and weather prediction data 13g can be detected. The selecting unit 15i registers the selected time schedule in resurvey schedule data 13h. In addition, the selecting unit 15i may selects a time schedule for conducting a resurvey of a position at which abnormality is not detected in an image among vertical G, a sound and an image.

FIG. 20 is a view schematically illustrating a flow of selecting a time schedule in a selecting unit. With an example of FIG. 20, running conditions that abnormality can be detected assume that the traffic is deserted, an image is captured during daytime and the weather is fine. The selecting unit 15i specifies a date and a time zone which satisfy traffic conditions from the traffic prediction data 13e. Further, the selecting unit 15i specifies a sunshine period from the sunshine data 13f. Furthermore, the selecting unit 15i specifies a date which satisfies weather conditions from the weather prediction data 13g. Still further, the selecting unit 15i selects an overlapping date and time zone from the specified date and time zone. With the example of FIG. 20, the selecting unit 15i assumes that the "AA" route and the "inbound" car lane on January 11 of the traffic prediction data 13e is "deserted" in the afternoon and the conditions are satisfied, and 9:00 to 17:00 from to January to April of the sunshine data 13f is a sunshine period and January 11 satisfies the weather conditions. Hence, the selecting unit 15i selects 12:00 on January 11 as a resurvey time schedule for the "AA" route and the "inbound" car lane. The selecting unit 15i registers the selected time schedule in the resurvey schedule data 13h. In addition, a car number may be registered by an administrator, or information about a car which is not used on a scheduled date for a resurvey is obtained from another server device which manages a car allocation situation to set a car for conducting a resurvey at random or according to a predetermined rule.

The output unit 15f further outputs the selected time schedule for a resurvey as information for instructing a resurvey. According to the first aspect, the output unit 15f generates screen information of a screen which displays a resurvey time schedule according to a browsing request from a service subscriber terminal 50, and outputs the screen information to the service subscriber terminal 50. For example, the output unit 15f generates screen information which configures a resurvey instruction screen to be displayed with a resurvey time schedule, and outputs the screen information to the service subscriber terminal 50. The screen including a resurvey time schedule is displayed in this way, so that a road researcher can learn in what time schedule a resurvey needs to be conducted to obtain information for deciding deterioration.

Figure 21:
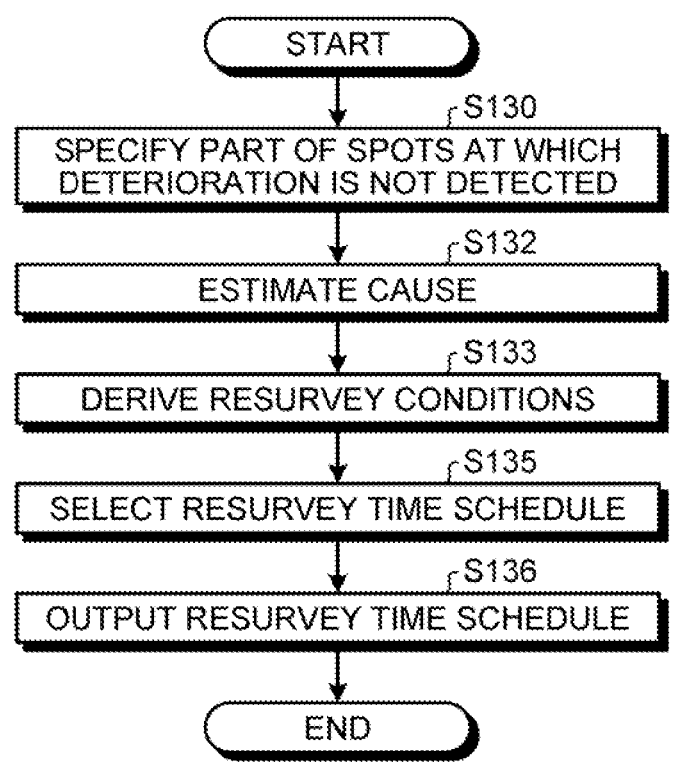
FIG. 21 is a flowchart illustrating procedure of resurvey instruction processing according to the third embodiment.

FIG. 21 is a flowchart illustrating procedure of resurvey instruction processing according to the third embodiment. In addition, the same portions as in resurvey instruction processing according to first and second embodiments illustrated in FIGS. 11 and 14 will be assigned the same reference numerals and will not be described.

As illustrated in FIG. 21, the selecting unit 15i selects a resurvey time schedule matching conditions that abnormality derived from the deriving unit 15h can be detected (step S135). The output unit 15f generates screen information of a screen which displays a survey time schedule, outputs the generated screen information to the service subscriber terminal 50 (step S136) and finishes processing.

Effect of Third Embodiment

As described above, the road surface survey device 10 according to the present embodiment selects a resurvey time schedule based on traffic prediction data, sunshine data and weather prediction data stored in a memory unit 13, and outputs the selected resurvey time schedule as a resurvey instruction. By this means, with the road surface survey device 10 according to the present embodiment, a researcher can learn in what time schedule a resurvey needs to be conducted to detect abnormality which is not detected, so that it is possible to efficiently resurvey deterioration of a road surface.

[d] Fourth Embodiment

Although examples related to a disclosed device has been described above, the present invention may be implemented in various different modes in addition to the above examples. Hence, another example included in the present invention will be described below.

Although cases have been described with the above examples where a camera 31, a G sensor 32 and a microphone 34 are provided in a simple device 30 and abnormality is detected from each detection result of a road, the disclosed device is by no means limited to this. For example, it may be possible to provide the camera 31 and the G sensor 32 in the simple device 30, detect abnormality from each detection result of a road, specify a position at which abnormality is detected by one of the camera 31 and the G sensor 32 and outputs an instruction of a resurvey of the specified position.

Further, although cases have been described with the above examples where a road surface survey device 10 detects abnormality from video data, acceleration data and sound data, the disclosed device is by no means limited to this. For example, the simple device 30 and the road surface survey device 10 may execute the following processing. That is, the simple device 30 detects abnormality in each of video data, acceleration data and sound data, and transmits information indicating a detection result including a position at which abnormality is detected, to the road surface survey device 10. The road surface survey device 10 may specify a position at which abnormality is not detected only in part of detection results, from information indicating the received detection results, and outputs an instruction of a resurvey of the specified position. That is, the simple device 30 may perform processings of an abnormal area detecting unit 15b, a running sound abnormality detecting unit 15c and an acceleration abnormality detecting unit 15d by means of a control unit such as a CPU which is not illustrated, and transmit a processing result to the road surface survey device 10.

Further, although cases have been described with the above examples where the road surface survey device 10 outputs screen information of various screens such as a resurvey instruction screen 80 from a communication I/F unit 12, and makes a service subscriber terminal 50 display the screen information, the road surface survey device 10 is not limited to this. For example, it may be possible to output screen information of various operation screens to a display unit such as a display provided in the road surface survey device 10 and make the display unit display the screen information, and obtain operation information for an operation screen from an operation unit such as a mouse and a keyboard provided in the road surface survey device 10.

Dispersion and Integration

Further, each illustrated component of each device is not necessarily configured as physically illustrated. That is, a specific mode of dispersion and integration of each device is not limited to the illustrated mode, the entire or part of the device may be configured to be dispersed and integrated functionally and physically in arbitrary units according to various loads and a use situation. For example, each component of a registering unit 15a, an abnormal area detecting unit 15b, a running sound abnormality detecting unit 15c, an acceleration abnormality detecting unit 15d, a specifying unit 15e, an output unit 15f, an estimating unit 15g, a deriving unit 15h and a selecting unit 15i may be connected through a network as an external device of the road surface survey device 10. Further, each of the above components may be provided in another device, and connected through a network and collaborate to realize a function of the above road surface survey device.

Road Surface Survey Program

Various processings described with the above embodiments can be realized by causing a computer such as a personal computer or a work station to execute a program prepared in advance. Hence, an example of a computer which executes the road surface survey program including the same function as the above example will be described using FIG. 22.

Figure 22:
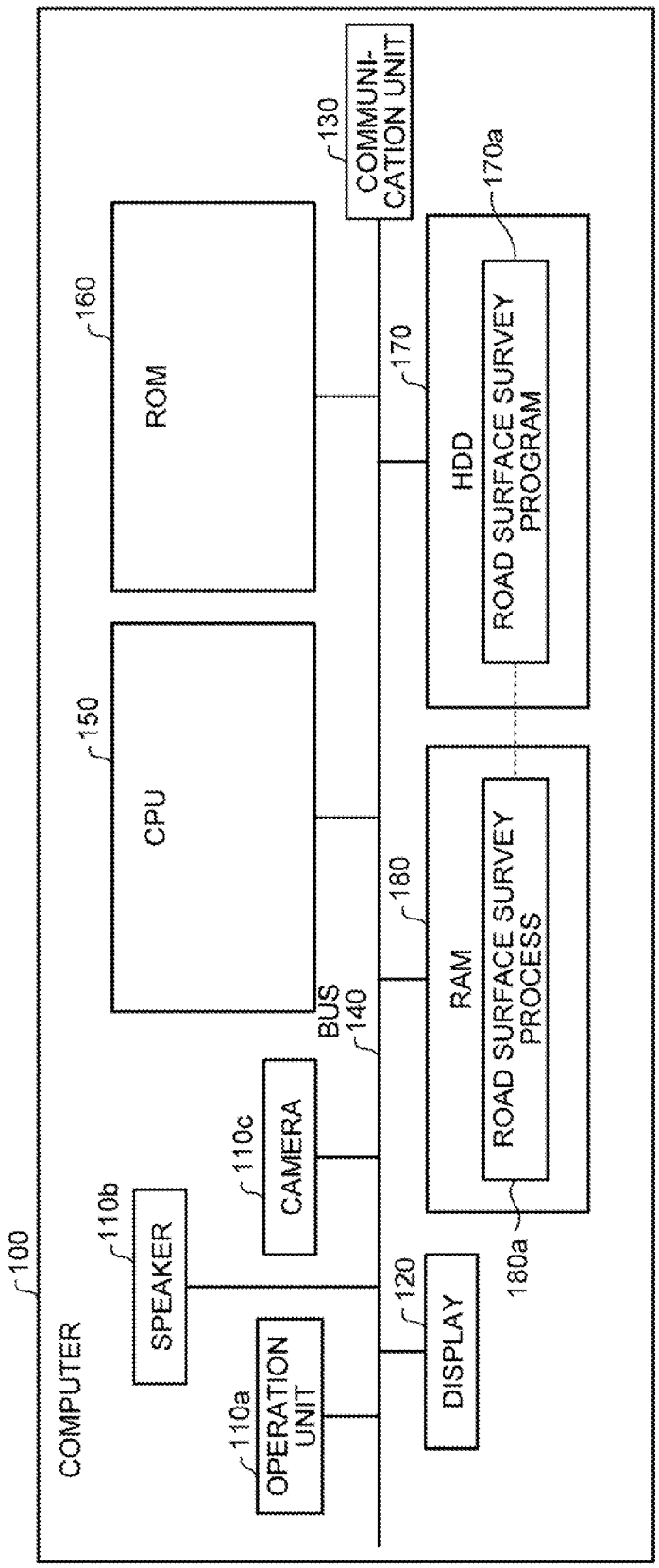
FIG. 22 is a view for explaining an example of a computer which executes a road surface survey program.

FIG. 22 is a view for describing an example of a computer which executes the road surface survey program. As illustrated in FIG. 22, a computer 100 has an operation unit 110a, a speaker 110b, a camera 110c, a display 120 and a communication unit 130. Further, this computer 100 has a CPU 150, a ROM 160, a HDD 170 and a RAM 180. Each of these units 110 to 180 is connected through a bus 140.

In the HDD 170, a road surface survey program 170a which exhibits the same functions as in the registering unit 15a, the abnormal area detecting unit 15b, the running sound abnormality detecting unit 15c, the acceleration abnormality detecting unit 15d, the specifying unit 15e, the output unit 15f, the estimating unit 15g, the deriving unit 15h and the selecting unit 15i is stored in advance. This road surface survey program 170a may be adequately integrated or separated similar to each component in the first to third embodiments. That is, as to each data stored in the HDD 170, all items of data does not need to be stored in the HDD 170 at all times, and only data for processing only needs to be stored in the HDD 170.

Further, the CPU 150 reads the road surface survey program 170a from the HDD 170 to expand in the RAM 180. By this means, as illustrated in FIG. 22, the road surface survey program 170a functions as a road surface survey process 180a. This road surface survey process 180a adequately expands various items of data read from the HDD 170, to an allocated area on the RAM 180, and executes various processings based on various items of expanded data. In addition, the road surface survey process 180a includes processings executed in the registering unit 15a, the abnormal area detecting unit 15b, the running sound abnormality detecting unit 15c, the acceleration abnormality detecting unit 15d, the specifying unit 15e, the output unit 15f, the estimating unit 15g, the deriving unit 15h and the selecting unit 15i such as processings illustrated in FIGS. 8 to 11. Further, as to each processing unit which is virtually realized on the CPU 150, all processing units do not need to operate on the CPU 150 at all times, and only processing units which need to perform processing only need to be virtually realized.

In addition, the above road surface survey program 170a does not necessarily need to be stored in the HDD 170 and the ROM 160 from the first. For example, each program is stored in "portable physical media" such as flexible disks inserted in the computer 100 of so-called FDs, CD-ROMs, DVD disks, magneto-optical disks and IC cards. Further, the computer 100 may acquire each program from these portable physical media, and execute the program. Furthermore, by storing each program in, for example, another computer or a server device connected to the computer 100 through a public network, Internet, a LAN or a WAN, the computer 100 may acquire and execute each program.

A first aspect of a road surface survey program disclosed in this application provides an effect of efficiently resurveying deterioration of a road surface.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a road surface survey program causing a computer to execute a process for surveying a road surface, the process comprising:

specifying a position at which an abnormality is detected by one of a first detector and a second detector, wherein the abnormality is not detected by the other of the first detector and the second detector, and wherein the first detector is a camera mounted on a vehicle configured to capture an image of a road surface and the second detector is an acceleration sensor mounted on the vehicle configured to measure a change in an acceleration when the vehicle runs on the road surface;

determining a cause for the abnormality having not been detected by the other of the first detector and the second detector at the specified position;

deriving a condition under which to conduct a resurvey of the specified position such that the determined cause is evaded; and outputting an instruction to conduct the resurvey of the specified position under the derived condition.

2. The non-transitory computer-readable recording medium according to claim 1, wherein the process further includes selecting, when the first detector does not detect the abnormality, a time schedule for conducting the resurvey under the derived condition based on a sunshine time, a traffic predicted on the road and a predicted weather per certain period stored in a memory; and the outputting includes outputting the selected resurvey time schedule.

3. The non-transitory computer-readable recording medium according to claim 1, wherein the specifying includes specifying one or two positions at which an abnormality is detected, from among a position at which an abnormality is detected by the first detector, a position at which an abnormality is detected by the second detector and a position at which an abnormality is detected by a third detector, wherein the third detector is a sound sensor mounted on the vehicle which records a running sound when the vehicle runs on the road surface.

4. A road surface survey device comprising:

a processor coupled to a memory, wherein the processor executes a process including:

specifying a position at which an abnormality is detected by one of a first detector and a second detector, wherein the abnormality is not detected by the other of the first detector and the second detector, and wherein the first detector is a camera mounted on a vehicle configured to capture an image of a road surface and the second detector is an acceleration sensor mounted on the vehicle configured to measure a change in an acceleration when the vehicle runs on the road surface;

determining a cause for the abnormality having not been detected by the other of the first detector and the second detector at the specified position;

deriving a condition under which to conduct a resurvey of the specified position such that the determined cause is evaded; and outputting an instruction to conduct the resurvey of the specified position under the derived condition.

5. The road surface survey device according to claim 4, wherein the process further includes selecting, when the first detector does not detect the abnormality, a time schedule for conducting the resurvey under the derived condition based on a sunshine time, a traffic predicted on the road and a predicted weather per certain period stored in the memory, and the instruction to conduct the resurvey includes the selected resurvey time schedule.

6. The road surface survey device according to claim 4, wherein the specifying includes specifying one or two positions at which an abnormality is detected from among a position at which an abnormality is detected by the first detector, a position at which an abnormality is detected by the second detector and a position at which an abnormality is detected by a third detector, wherein the third detector is a sound sensor mounted on the vehicle which records a running sound when the vehicle runs on the road surface.

* * * * *